(12) United States Patent
York

(10) Patent No.: US 8,683,709 B2
(45) Date of Patent: Apr. 1, 2014

(54) PORTABLE ARTICULATED ARM COORDINATE MEASURING MACHINE WITH MULTI-BUS ARM TECHNOLOGY

(75) Inventor: Frederick York, Longwood, FL (US)

(73) Assignee: Faro Technologies, Inc., Lake Mary, FL (US)

(*) Notice: Subject to any disclaimer, the term of this patent is extended or adjusted under 35 U.S.C. 154(b) by 632 days.

(21) Appl. No.: 13/006,468

(22) Filed: Jan. 14, 2011

(65) Prior Publication Data

US 2011/0178764 A1    Jul. 21, 2011

Related U.S. Application Data

(60) Provisional application No. 61/296,555, filed on Jan. 20, 2010, provisional application No. 61/355,279, filed on Jun. 16, 2010, provisional application No. 61/351,347, filed on Jun. 4, 2010.

(51) Int. Cl.
*G01B 5/008*    (2006.01)

(52) U.S. Cl.
USPC ........................................................... 33/503

(58) Field of Classification Search
USPC ............................................ 33/503, 556, 559
See application file for complete search history.

(56) References Cited

U.S. PATENT DOCUMENTS

| | | | |
|---|---|---|---|
| 1,535,312 A | 4/1925 | Hosking | |
| 1,918,813 A | 7/1933 | Kinzy | |
| 2,316,573 A | 4/1943 | Egy | |
| 2,333,243 A | 11/1943 | Glab | |
| 2,702,683 A | 2/1955 | Green et al. | |
| 2,748,926 A | 6/1956 | Leahy | |
| 2,924,495 A | 2/1960 | Haines | |
| 2,966,257 A | 12/1960 | Littlejohn | |
| 2,983,367 A | 5/1961 | Paramater et al. | |
| 3,066,790 A | 12/1962 | Armbruster | |

(Continued)

FOREIGN PATENT DOCUMENTS

| | | |
|---|---|---|
| CN | 2236119 | 9/1996 |
| CN | 2508896 | 9/2002 |

(Continued)

OTHER PUBLICATIONS

Information on Electro-Optical Information Systems; EOIS 3D Mini-Moire C.M.M. Sensor for Non-Contact Measuring & Surface Mapping; Direct Dimensions, Jun. 1995.

(Continued)

*Primary Examiner* — Yaritza Guadalupe-McCall
(74) *Attorney, Agent, or Firm* — Cantor Colburn LLP

(57) ABSTRACT

A portable articulated arm coordinate measuring machine (AACMM) with multi-bus arm technology that includes a manually positionable articulated arm portion, a measurement device, and an electronic circuit. The electronic circuit is configured to receive a position signal from the arm portion and to provide data corresponding to a position of the measurement device. The AACMM further includes a probe end, an accessory device, an encoder data bus, and a first device data bus. The encoder data bus is coupled to the arm portion and the electronic circuit, and the encoder data bus is configured to send the position signal to the electronic circuit. The first device data bus is coupled to the accessory device and the electronic circuit. The first device data bus is configured to operate simultaneously with and independently of the encoder data bus for sending accessory device data from the accessory device to the electronic circuit.

37 Claims, 24 Drawing Sheets

(56) References Cited

U.S. PATENT DOCUMENTS

| | | | |
|---|---|---|---|
| 3,458,167 A | 7/1969 | Cooley, Jr. |
| 4,138,045 A | 2/1979 | Baker |
| 4,178,515 A | 12/1979 | Tarasevich |
| 4,340,008 A | 7/1982 | Mendelson |
| 4,379,461 A | 4/1983 | Nilsson et al. |
| 4,424,899 A | 1/1984 | Rosenberg |
| 4,430,796 A | 2/1984 | Nakagawa |
| 4,457,625 A | 7/1984 | Greenleaf et al. |
| 4,506,448 A | 3/1985 | Topping et al. |
| 4,537,233 A | 8/1985 | Vroonland et al. |
| 4,606,696 A | 8/1986 | Slocum |
| 4,659,280 A | 4/1987 | Akeel |
| 4,663,852 A | 5/1987 | Guarini |
| 4,664,588 A | 5/1987 | Newell et al. |
| 4,676,002 A | 6/1987 | Slocum |
| 4,714,339 A | 12/1987 | Lau et al. |
| 4,751,950 A | 6/1988 | Bock |
| 4,767,257 A | 8/1988 | Kato |
| 4,790,651 A | 12/1988 | Brown et al. |
| 4,816,822 A | 3/1989 | Vache et al. |
| 4,882,806 A | 11/1989 | Davis |
| 4,954,952 A | 9/1990 | Ubhayakar et al. |
| 4,982,841 A | 1/1991 | Goedecke |
| 4,996,909 A | 3/1991 | Vache et al. |
| 5,025,966 A | 6/1991 | Potter |
| 5,027,951 A | 7/1991 | Johnson |
| 5,069,524 A | 12/1991 | Watanabe et al. |
| 5,189,797 A | 3/1993 | Granger |
| 5,205,111 A | 4/1993 | Johnson |
| 5,211,476 A | 5/1993 | Coudroy |
| 5,213,240 A | 5/1993 | Dietz et al. |
| 5,219,423 A | 6/1993 | Kamaya |
| 5,239,855 A | 8/1993 | Schleifer et al. |
| 5,289,264 A | 2/1994 | Steinbichler |
| 5,319,445 A | 6/1994 | Fitts |
| 5,332,315 A | 7/1994 | Baker et al. |
| 5,372,250 A | 12/1994 | Johnson |
| 5,373,346 A | 12/1994 | Hocker |
| 5,402,582 A | 4/1995 | Raab |
| 5,412,880 A | 5/1995 | Raab |
| 5,430,384 A | 7/1995 | Hocker |
| 5,455,670 A | 10/1995 | Payne et al. |
| 5,455,993 A | 10/1995 | Link et al. |
| 5,510,977 A | 4/1996 | Raab |
| 5,528,505 A | 6/1996 | Granger et al. |
| 5,535,524 A | 7/1996 | Carrier et al. |
| 5,611,147 A | 3/1997 | Raab |
| 5,623,416 A | 4/1997 | Hocker, III |
| 5,682,508 A | 10/1997 | Hocker, III |
| 5,724,264 A | 3/1998 | Rosenberg et al. |
| 5,752,112 A | 5/1998 | Paddock et al. |
| 5,754,449 A | 5/1998 | Hoshal et al. |
| 5,768,792 A | 6/1998 | Raab |
| 5,829,148 A | 11/1998 | Eaton |
| 5,832,416 A | 11/1998 | Anderson |
| 5,887,122 A | 3/1999 | Terawaki et al. |
| 5,926,782 A | 7/1999 | Raab |
| 5,956,857 A | 9/1999 | Raab |
| 5,978,748 A | 11/1999 | Raab |
| 5,983,936 A | 11/1999 | Schwieterman et al. |
| 5,996,790 A | 12/1999 | Yamada et al. |
| 5,997,779 A | 12/1999 | Potter |
| D423,534 S | 4/2000 | Raab et al. |
| 6,050,615 A | 4/2000 | Weinhold |
| 6,060,889 A | 5/2000 | Hocker |
| 6,067,116 A | 5/2000 | Yamano et al. |
| 6,112,423 A | 9/2000 | Sheehan |
| 6,125,337 A | 9/2000 | Rosenberg et al. |
| 6,131,299 A | 10/2000 | Raab et al. |
| 6,151,789 A | 11/2000 | Raab et al. |
| 6,163,294 A | 12/2000 | Talbot |
| 6,166,504 A | 12/2000 | Iida et al. |
| 6,166,811 A | 12/2000 | Long et al. |
| 6,219,928 B1 | 4/2001 | Raab et al. |
| D441,632 S | 5/2001 | Raab et al. |
| 6,240,651 B1 | 6/2001 | Schroeder et al. |
| 6,253,458 B1 | 7/2001 | Raab et al. |
| 6,282,195 B1 | 8/2001 | Miller et al. |
| 6,298,569 B1 | 10/2001 | Raab et al. |
| 6,339,410 B1 | 1/2002 | Milner et al. |
| 6,366,831 B1 | 4/2002 | Raab |
| 6,408,252 B1 | 6/2002 | De Smet |
| 6,418,774 B1 | 7/2002 | Brogaardh et al. |
| 6,438,856 B1 | 8/2002 | Kaczynski |
| 6,442,419 B1 | 8/2002 | Chu et al. |
| 6,470,584 B1 | 10/2002 | Stoodley |
| 6,477,784 B2 | 11/2002 | Schroeder et al. |
| 6,519,860 B1 | 2/2003 | Bieg et al. |
| D472,824 S | 4/2003 | Raab et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| 6,612,044 B2 | 9/2003 | Raab et al. |
| 6,621,065 B1 | 9/2003 | Fukumoto et al. |
| 6,626,339 B2 | 9/2003 | Gates et al. |
| 6,633,051 B1 | 10/2003 | Holloway et al. |
| 6,668,466 B1 | 12/2003 | Bieg et al. |
| D491,210 S | 6/2004 | Raab et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,826,664 B2 | 11/2004 | Hocker, III et al. |
| 6,868,359 B2 | 3/2005 | Raab |
| 6,879,933 B2 | 4/2005 | Steffey et al. |
| 6,892,465 B2 | 5/2005 | Raab et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,920,697 B2 | 7/2005 | Raab et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 * | 9/2005 | Russell .................... 33/503 |
| 6,965,843 B2 | 11/2005 | Raab et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,152,456 B2 | 12/2006 | Eaton |
| 7,174,651 B2 | 2/2007 | Raab et al. |
| 7,184,047 B1 | 2/2007 | Crampton |
| 7,191,541 B1 | 3/2007 | Weekers et al. |
| 7,196,509 B2 | 3/2007 | Teng |
| 7,199,872 B2 | 4/2007 | Van Cranenbroeck |
| 7,242,590 B1 | 7/2007 | Yeap et al. |
| 7,249,421 B2 | 7/2007 | MacManus et al. |
| 7,269,910 B2 | 9/2007 | Raab et al. |
| 7,285,793 B2 | 10/2007 | Husted |
| 7,296,979 B2 | 11/2007 | Raab et al. |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,337,344 B2 | 2/2008 | Barman et al. |
| 7,348,822 B2 | 3/2008 | Baer |
| 7,352,446 B2 | 4/2008 | Bridges et al. |
| 7,360,648 B1 | 4/2008 | Blaschke |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,430,068 B2 | 9/2008 | Becker et al. |
| 7,441,341 B2 | 10/2008 | Eaton |
| 7,447,931 B1 | 11/2008 | Rischar et al. |
| 7,449,876 B2 | 11/2008 | Pleasant et al. |
| 7,454,265 B2 | 11/2008 | Marsh |

(56) References Cited

U.S. PATENT DOCUMENTS

| | | |
|---|---|---|
| 7,463,368 B2 | 12/2008 | Morden et al. |
| 7,508,971 B2 | 3/2009 | Vaccaro et al. |
| 7,525,276 B2 | 4/2009 | Eaton |
| 7,545,517 B2 | 6/2009 | Rueb et al. |
| 7,546,689 B2 | 6/2009 | Ferrari et al. |
| 7,552,644 B2 | 6/2009 | Haase et al. |
| 7,561,598 B2 | 7/2009 | Stratton et al. |
| 7,564,250 B2 | 7/2009 | Hocker |
| 7,578,069 B2 | 8/2009 | Eaton |
| D599,226 S | 9/2009 | Gerent et al. |
| 7,589,595 B2 | 9/2009 | Cutler |
| 7,591,077 B2 | 9/2009 | Pettersson |
| 7,591,078 B2 | 9/2009 | Crampton |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| D607,350 S | 1/2010 | Cooduvalli et al. |
| 7,656,751 B2 | 2/2010 | Rischar et al. |
| 7,693,325 B2 | 4/2010 | Pulla et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,735,234 B2 | 6/2010 | Briggs et al. |
| 7,743,524 B2 | 6/2010 | Eaton et al. |
| 7,752,003 B2 | 7/2010 | MacManus |
| 7,765,707 B2 | 8/2010 | Tomelleri |
| 7,769,559 B2 | 8/2010 | Reichert |
| 7,774,949 B2 | 8/2010 | Ferrari |
| 7,779,548 B2 | 8/2010 | Ferrari |
| 7,779,553 B2 | 8/2010 | Jordil et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| RE42,055 E | 1/2011 | Raab et al. |
| RE42,082 E | 2/2011 | Raab et al. |
| 7,881,896 B2 | 2/2011 | Atwell et al. |
| 7,903,261 B2 | 3/2011 | Saint Clair et al. |
| 7,908,757 B2 | 3/2011 | Ferrari |
| 8,052,857 B2 | 11/2011 | Townsend |
| 8,065,861 B2 | 11/2011 | Caputo |
| 8,082,673 B2 | 12/2011 | Desforges et al. |
| 8,099,877 B2 | 1/2012 | Champ |
| 8,123,350 B2 | 2/2012 | Cannell et al. |
| 8,171,650 B2 * | 5/2012 | York et al. ................ 33/503 |
| 8,276,286 B2 | 10/2012 | Bailey et al. |
| 8,284,407 B2 | 10/2012 | Briggs et al. |
| 8,352,212 B2 | 1/2013 | Fetter et al. |
| 8,533,967 B2 | 9/2013 | Bailey et al. |
| 2001/0004269 A1 | 6/2001 | Shibata et al. |
| 2002/0032541 A1 | 3/2002 | Raab et al. |
| 2002/0087233 A1 | 7/2002 | Raab |
| 2002/0128790 A1 | 9/2002 | Woodmansee |
| 2002/0170192 A1 | 11/2002 | Steffey et al. |
| 2003/0033104 A1 | 2/2003 | Gooche |
| 2003/0053037 A1 | 3/2003 | Blaesing-Bangert et al. |
| 2003/0125901 A1 | 7/2003 | Steffey et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0208919 A1 | 11/2003 | Raab et al. |
| 2003/0221326 A1 | 12/2003 | Raab et al. |
| 2004/0022416 A1 | 2/2004 | Lemelson et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0139265 A1 | 7/2004 | Hocker, III et al. |
| 2004/0162700 A1 | 8/2004 | Rosenberg et al. |
| 2004/0172215 A1 * | 9/2004 | Russell ................ 33/504 |
| 2004/0259533 A1 | 12/2004 | Nixon et al. |
| 2005/0016008 A1 | 1/2005 | Raab et al. |
| 2005/0028393 A1 | 2/2005 | Raab et al. |
| 2005/0085940 A1 | 4/2005 | Griggs et al. |
| 2005/0144799 A1 | 7/2005 | Raab et al. |
| 2005/0151963 A1 | 7/2005 | Pulla et al. |
| 2005/0166413 A1 | 8/2005 | Crampton |
| 2005/0188557 A1 | 9/2005 | Raab et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0096108 A1 | 5/2006 | Raab et al. |
| 2006/0123649 A1 | 6/2006 | Muller |
| 2006/0129349 A1 | 6/2006 | Raab et al. |
| 2006/0169050 A1 | 8/2006 | Kobayashi et al. |
| 2006/0169608 A1 | 8/2006 | Carnevali |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0105238 A1 | 5/2007 | Mandl et al. |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0153297 A1 | 7/2007 | Lau |
| 2007/0163134 A1 | 7/2007 | Eaton |
| 2007/0163136 A1 | 7/2007 | Eaton |
| 2007/0176648 A1 | 8/2007 | Baer |
| 2007/0177016 A1 | 8/2007 | Wu |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0221522 A1 | 9/2007 | Yamada et al. |
| 2007/0223477 A1 | 9/2007 | Eidson |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052936 A1 | 3/2008 | Briggs et al. |
| 2008/0066583 A1 | 3/2008 | Lott |
| 2008/0068103 A1 | 3/2008 | Cutler |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0245452 A1 | 10/2008 | Law et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |

(56) References Cited

U.S. PATENT DOCUMENTS

| | | |
|---|---|---|
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2009/0000136 A1 | 1/2009 | Crampton |
| 2009/0016475 A1 | 1/2009 | Rischar et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0139105 A1 | 6/2009 | Granger |
| 2009/0157419 A1 | 6/2009 | Bursey |
| 2009/0165317 A1 | 7/2009 | Little |
| 2009/0177435 A1 | 7/2009 | Heininen |
| 2009/0177438 A1 | 7/2009 | Raab |
| 2009/0187373 A1 | 7/2009 | Atwell et al. |
| 2009/0241360 A1 | 10/2009 | Tait et al. |
| 2009/0249634 A1 | 10/2009 | Pettersson |
| 2009/0265946 A1 | 10/2009 | Jordil et al. |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0148013 A1 | 6/2010 | Bhotika et al. |
| 2010/0208062 A1 | 8/2010 | Pettersson |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0043515 A1 | 2/2011 | Stathis |
| 2011/0094908 A1 | 4/2011 | Trieu |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0164114 A1 | 7/2011 | Kobayashi et al. |
| 2011/0173827 A1 | 7/2011 | Bailey et al. |
| 2011/0173828 A1* | 7/2011 | York et al. ............... 33/503 |
| 2011/0178753 A1* | 7/2011 | York ............... 702/95 |
| 2011/0178755 A1* | 7/2011 | York ............... 33/503 |
| 2011/0178762 A1* | 7/2011 | York ............... 33/503 |
| 2011/0178764 A1* | 7/2011 | York ............... 702/152 |
| 2011/0178765 A1 | 7/2011 | Atwell et al. |
| 2011/0178766 A1* | 7/2011 | York et al. ............... 33/503 |
| 2011/0192043 A1 | 8/2011 | Ferrari |
| 2011/0273568 A1 | 11/2011 | Lagassey |
| 2012/0181194 A1 | 7/2012 | McEwan et al. |
| 2012/0210678 A1 | 8/2012 | Alcouloumre et al. |
| 2012/0260512 A1 | 10/2012 | Kretschmer et al. |
| 2012/0260611 A1 | 10/2012 | Jones |
| 2013/0025143 A1 | 1/2013 | Bailey et al. |
| 2013/0025144 A1 | 1/2013 | Briggs et al. |
| 2013/0062243 A1 | 3/2013 | Chang et al. |
| 2013/0097882 A1 | 4/2013 | Bridges et al. |
| 2013/0125408 A1 | 5/2013 | Atwell et al. |
| 2013/0205606 A1 | 8/2013 | Briggs et al. |
| 2013/0212889 A9 | 8/2013 | Bridges et al. |
| 2013/0286196 A1* | 10/2013 | Atwell ............... 348/136 |

FOREIGN PATENT DOCUMENTS

| | | |
|---|---|---|
| CN | 2665668 | 12/2004 |
| CN | 1818537 | 8/2006 |
| CN | 201266071 | 7/2009 |
| DE | 3245060 A1 | 7/1983 |
| DE | 4410775 A1 | 10/1995 |
| DE | 29622033 | 2/1997 |
| DE | 19543763 A1 | 5/1997 |
| DE | 19820307 | 11/1999 |
| DE | 10026357 A1 | 1/2002 |
| DE | 202005000983 U1 | 4/2005 |
| DE | 102004015668 B3 | 9/2005 |
| DE | 19720049 B4 | 1/2006 |
| DE | 10114126 B4 | 8/2006 |
| DE | 102004010083 B4 | 11/2006 |
| DE | 102005060967 A1 | 6/2007 |
| DE | 102006023902 | 11/2007 |
| DE | 102006035292 A1 | 1/2008 |
| DE | 102008039838 A1 | 3/2010 |
| DE | 102005036929 B4 | 6/2010 |
| DE | 102008062763 B3 | 7/2010 |
| DE | 102009001894 | 9/2010 |
| EP | 0546784 A2 | 6/1993 |
| EP | 0730210 | 9/1996 |
| EP | 0614517 | 3/1997 |
| EP | 1160539 | 12/2001 |
| EP | 1189124 | 3/2002 |
| EP | 0767357 B1 | 5/2002 |
| EP | 1361414 A1 | 11/2003 |
| EP | 1452279 | 9/2004 |
| EP | 1468791 A1 | 10/2004 |
| EP | 1669713 A1 | 6/2006 |
| EP | 1734425 | 12/2006 |
| EP | 1429109 B1 | 4/2007 |
| EP | 1764579 B1 | 12/2007 |
| EP | 1878543 | 1/2008 |
| EP | 1967930 | 9/2008 |
| EP | 2023077 A1 | 2/2009 |
| EP | 2060530 A1 | 5/2009 |
| EP | 2068067 A1 | 6/2009 |
| EP | 2108917 A1 | 10/2009 |
| EP | 2400261 A1 | 12/2011 |
| FR | 2935043 A1 | 2/2010 |
| GB | 894320 | 4/1962 |
| GB | 2255648 A | 11/1992 |
| GB | 2341203 A | 3/2000 |
| GB | 2420241 | 5/2006 |
| GB | 2452033 A | 2/2009 |
| JP | 5581525 | 6/1955 |
| JP | 5827264 | 2/1983 |
| JP | 6313710 A | 8/1994 |
| JP | 7210586 A | 8/1995 |
| JP | 2003194526 | 7/2003 |
| JP | 2004257927 A | 9/2004 |
| JP | 2005517908 | 6/2005 |
| JP | 2006241833 | 9/2006 |
| JP | 2006301991 A | 11/2006 |
| JP | 2009524057 | 6/2009 |
| WO | 9208568 A1 | 5/1992 |
| WO | 9808050 | 2/1998 |
| WO | 9910706 A1 | 3/1999 |
| WO | WO0014474 | 3/2000 |
| WO | 0033149 | 6/2000 |
| WO | 0034733 | 6/2000 |
| WO | 02101323 A2 | 12/2002 |
| WO | 2004096502 A1 | 11/2004 |
| WO | 2005072917 | 8/2005 |
| WO | 2005075875 | 8/2005 |
| WO | 2005100908 A1 | 10/2005 |

(56) References Cited

FOREIGN PATENT DOCUMENTS

| WO | 2006051264 | A1 | 5/2006 |
|---|---|---|---|
| WO | 2007002319 | A1 | 1/2007 |
| WO | 2007/028941 | A1 | 3/2007 |
| WO | 2007125081 | A1 | 11/2007 |
| WO | 2007144906 | A1 | 12/2007 |
| WO | 2008027588 | | 3/2008 |
| WO | WO2008027588 | | 3/2008 |
| WO | 2008047171 | | 4/2008 |
| WO | 2008064276 | A3 | 5/2008 |
| WO | 2008066896 | | 6/2008 |
| WO | 2008075170 | A1 | 6/2008 |
| WO | 2009001165 | A1 | 12/2008 |
| WO | WO2008/157061 | A1 | 12/2008 |
| WO | 2009016185 | A1 | 2/2009 |
| WO | 2009083452 | A1 | 7/2009 |
| WO | 2009130169 | A1 | 10/2009 |
| WO | WO2009127526 | A1 | 10/2009 |
| WO | 2009149740 | A1 | 12/2009 |
| WO | 2010040742 | A1 | 4/2010 |
| WO | 2010092131 | A1 | 8/2010 |
| WO | 2010108089 | A2 | 9/2010 |
| WO | 2010148525 | A1 | 12/2010 |
| WO | 2011000435 | A1 | 1/2011 |
| WO | 2011000955 | A1 | 1/2011 |
| WO | 2011/057130 | A2 | 5/2011 |
| WO | 2012038446 | A1 | 3/2012 |

OTHER PUBLICATIONS

Written Opinion of the International Searching Authority for International Application No. PCT/US2011/021272 mailed Apr. 7, 2011.
International Search Report for International Application No. PCT/US2011/021272 mailed Apr. 7, 2011.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
HYDROpro Navigation, Hydropgraphic Survey Software, Trimble, www.trimble.com, Copyright 1997-2003.
International Preliminary Report on Patentability for PCT/US2011/021253; Date of Completion May 9, 2012.
International Preliminary Report on Patentability for PCT/US2011/021274; Date of Completion Apr. 12, 2012.
Trimble—Trimble SPS630, SPS730 and SPS930 Universal Total Stations, [on-line] http://www.trimble.com/sps630_730_930.shtml (1 of 4), [Retreived Jan. 26, 2010 8:50:29AM].
Written Opinion of the International Searching Authority for International Application No. PCT/US2011/021253; Mailing Date of Mar. 22, 2012.
MG Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
P Ben-Tzvi, et al "Extraction of 3D Images Using Pitch-Actuated 2D Laser Range Finder for Robotic Vision" (6 pages) BNSDOCID <XP 31840390A_1_>.
International Search Report for International Application No. PCT/US2013/040321 mailed Jul. 15, 2013.
YK Cho, et al. "Light-weight 3D LADAR System for Construction Robotic Operations" (pp. 237-244); 26th International Symposium on Automation and Robotics in Construction (ISARC 2009).
Written Opinion for International Application No. PCT/US2013/040321 mailed Jul. 15, 2013.
Examination Report for German Application No. 11 2011 100 290.4 Report dated Jul. 16, 2013; based on PCT/US2011/021247.
Romer "Romer Measuring Arms Portable CMMs for R&D and shop floor" (Mar. 2009) Hexagon Metrology (16 pages).
Jgeng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
International Search Report for International Application No. PCT/US/2013/041826 filed May 20, 2013; mailed Jul. 29, 2013.
Written Opinion for International Application No. PCT/US/2013/041826 filed May 20, 2013; mailed Jul. 29, 2013.
Anonymous : So wird's gemacht: Mit T-DSL und Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
International Search Report and Written Opinion for International Application No. PCT/US2011/021273 filed Jan. 14, 2011.
International Search Report for International Application No. PCT/2011/020625 mailed Feb. 25, 2011.
International Search Report for International Application No. PCT/US2011/021270 mailed May 2, 2011.
International Search Report for International Application No. PCT2011/021276 filed Jan. 14, 2011.
International Search Report for International Application No. PCT/US2011/021246 mailed Apr. 12, 2011.
International Search Report for International Application No. PCT/US2011/021249 mailed Apr. 21, 2011.
Internation Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021278 mailed May 25, 2011.
Jasperneite, et al., Enhancements to the Time Synchronization Standard IEEE-1588 for a System of Cascaded Bridges, IEEE, 2004.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Written Opinion of the International Searching Authority for International Application No. PCT/US2011/021246 mailed Apr. 12, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Written Opinion of the International Searching Authority for International Application No. PCT/US2011/021264 mailed May 31, 2011.

(56) References Cited

OTHER PUBLICATIONS

Written Opinion for International Application No. PCT/US2011/021273 mailed Jan. 14, 2011.
Written Opinion of the International Searching Authority for International Application No. PCT/US2011/021278 mailed May 25, 2011.
Written Opinion of the International Searching Authority for International Application No. PCT/US2011/020625 mailed Feb. 25, 2011.
Written Opinion of the International Searching Authority for Internationl Application No. PCT/US2011/021270 mailed May 2, 2011.
Written Opinion for International Application No. PCT/US2011/021276 filed Jan. 14, 2011.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021263. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021272. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
Examination Report under Section 18(3); Report dated Oct. 31, 2012; Application No. GB1210309.9.
Examination Report under Section 18(3); Report dated Nov. 1, 2012; Application No. GB1210311.5.
Examination Report under Section 18(3); Report dated Nov. 6, 2012; Application No. GB1210306.5.
International Search Report for International Application No. PCT/US2013/040309 mailed Jul. 15, 2013.
Written Opinion for International Application No. PCT/US2013/040309 mailed Jul. 15, 2013.
German Patent Application No. 11 2011 100 291.2 dated Dec. 20, 2012.
Japanese Office Action and English Language summary for JP2012-550042 filed Jul. 20, 2012; based on International Application No. PCT/US2011/021249 filed Jan. 14, 2011.
Japanese Office Action and English Language summary for JP2012-550044 filed Jul. 20, 2012; based on International Application No. PCT/US2011/021252 filed Jan. 14, 2011.
Japanese Office Action and English Language summary for JP2012-550043 filed Jul. 20, 2012; based on International Application No. PCT/US2011/021250 filed Jan. 14, 2011.
Examination Report for German Application No. 11 2011 100 193.2 Report dated Dec. 20, 2012; based on PCT/US2011/021249.
Faro Product Catalog; Faro Arm; 68 pages; Faro Technologies Inc. 2009; printed Aug. 3, 2009.
Romer Measuring Arms; Portable CMMs for the shop floor; 20 pages; Hexagon Metrology, Inc. (2009) http//us.ROMER.com.
International Search Report of the International Searching Authority for Application No. PCT/US2013/022186; Date of Mailing: May 29, 2013.
Written Opinion of the International Searching Authority for Application No. PCT/US2013/022186; Date of Mailing: May 29, 2013.
ABB Flexibile Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.
International Search Report for International Application No. PCT/US2011/021248 mailed Sep. 19, 2011.
International Search Report for International Application No. PCT/US2011/021253 mailed Sep. 26, 2011.
International Search Report for International Application No. PCT/US2011/021794 mailed Sep. 23, 2011.
Romer "Romer Absolute Arm Maximum Performance Portable Measurement" (Printed Oct. 2010); Hexagon Metrology, Inc. htt://us:ROMER.com; Hexagon Metrology, Inc. 2010.
Romer Romer Absolute Arm Product Brochure: (2010); Hexagon Metrology; www.hexagonmetrology.com; Hexagon AB 2010.
Willoughby, P., "Elastically Averaged Precisoin Alignment", in: "Doctoral Thesis", Jun. 1, 2005, Massachusetts Institute of Technology, XP55005620, abstract 1.1 Motivation, Chapter 3, Chapter 6.
Written Opinion of the International Searching Authority for International Application No. PCT/US2011/021248 mailed Sep. 19, 2011.
Written Opinion of the International Searching Authority for International Application No. PCT/US2011/021253 mailed Sep. 26, 2011.
Written Opinion of the International Searching Authority for International Application No. PCT/US2011/021794.
International Search Report for International Application No. PCT/US2011/021274 mailed May 6, 2011.
International Search Report for International Patent Application PCT/US2011/050787; mailing date Nov. 3, 2011.
International Search Report for International Application No. PCT/US2011/020274; Date of Mailing May 6, 2011.
Written Opinion of the International Searching Authority for International Application No. PCT/US2011/021274 mailed May 6, 2011.
Written Opinion of the International Searching Authority for International Patent Application PCT/US2011/050787; mailing date Nov. 3, 2011.
GoMeasure3D—Your source for all things measurement, Baces 3D 100 Series Portable CMM from GoMeasure3D, [online], [retrieved Nov. 29, 2011], http://www.gomeasure3d.com/baces100.html.

(56) References Cited

OTHER PUBLICATIONS

It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.

Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm.

Electro-Optical Information Systems, "The Handy Handheld Digitizer" [online], [retrieved on Nov. 29, 2011], http://vidibotics.com/htm/handy.htm.

Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.

MicroScan 3D User Guide, RSI GmbH, 3D Systems & Software, Oberursel, Germany, email: info@rsi-gmbh.de, Copyright RSI Roland Seifert Imaging GmbH 2008.

Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.

German Office Action and English Language summary for DE 112011100292.0 filed Jul. 3, 2012, based on PCT Application US2011/021252 filed Jan. 14, 2011.

Chinese First Office Action and Search Report for Application No. 2011800005129.6; Issued Nov. 18, 2013.

MOOG Components Group; "Fiber Optic Rotary Joints; Product Guide" (4 pages) Dec. 2010; MOOG, Inc. 2010.

MOOG Components Group "Technical Brief; Fiber Optic Rotary Joints" Document No. 303 (6 pages) Mar. 2008; MOOG, Inc. 2008 Canada; Focal Technologies.

International Search Report dated Nov. 28, 2013 for International Application No. PCT/13/049562 filed Jul. 8, 2013 (7 pages).

Written Opinion of the International Search Authority dated Nov. 28, 2013 for International Application No. PCT/13/049562 filed Jul. 8, 2013 (10 pages).

International Search report of the International Application No. PCT/US2013/049562 mailed Nov. 28, 2013, 7 pages.

Written Opinion of the International Searching Authority for International Application No. PCT/US2013/049562 mailed Nov. 28, 2013, 10 pages.

\* cited by examiner

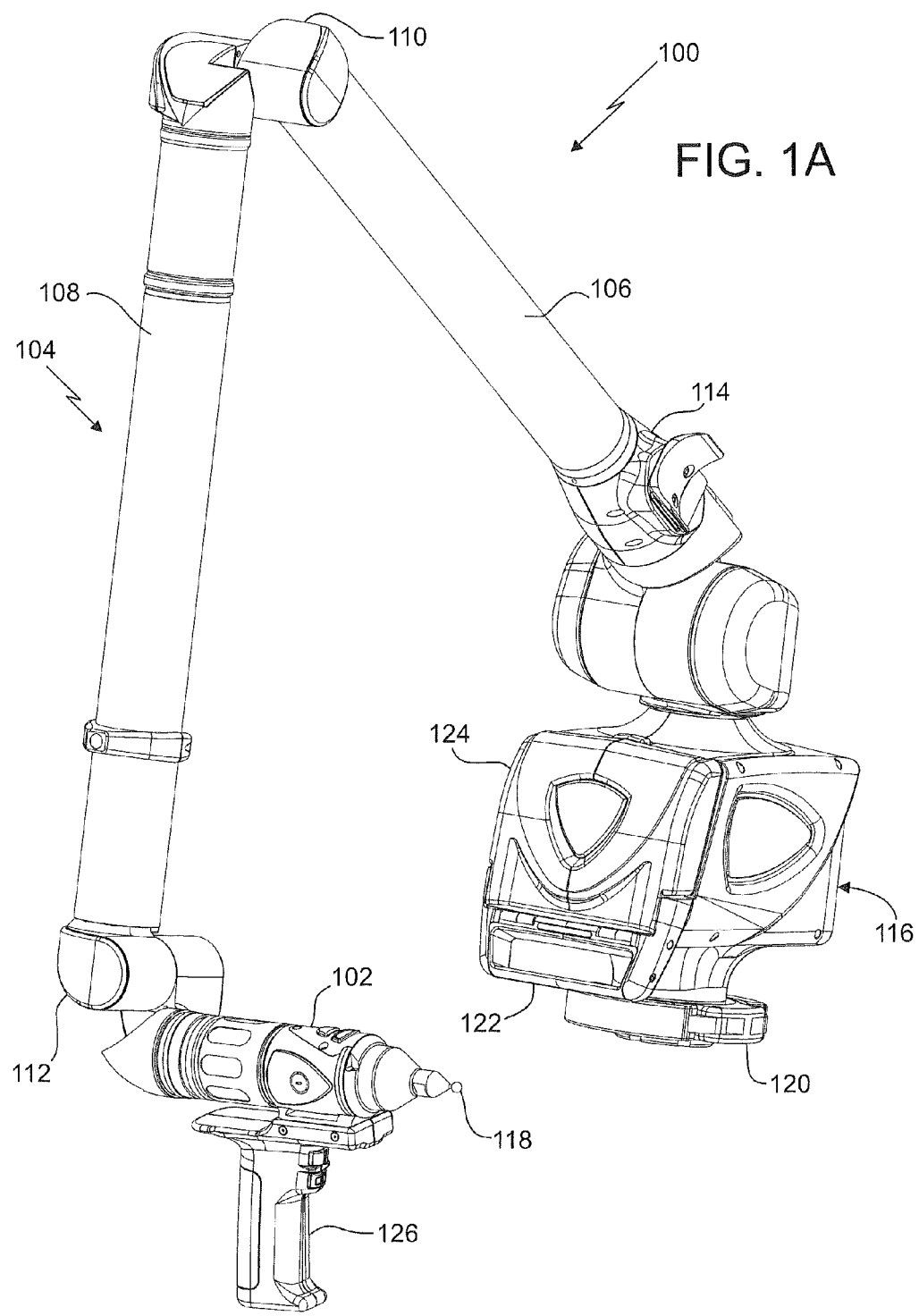

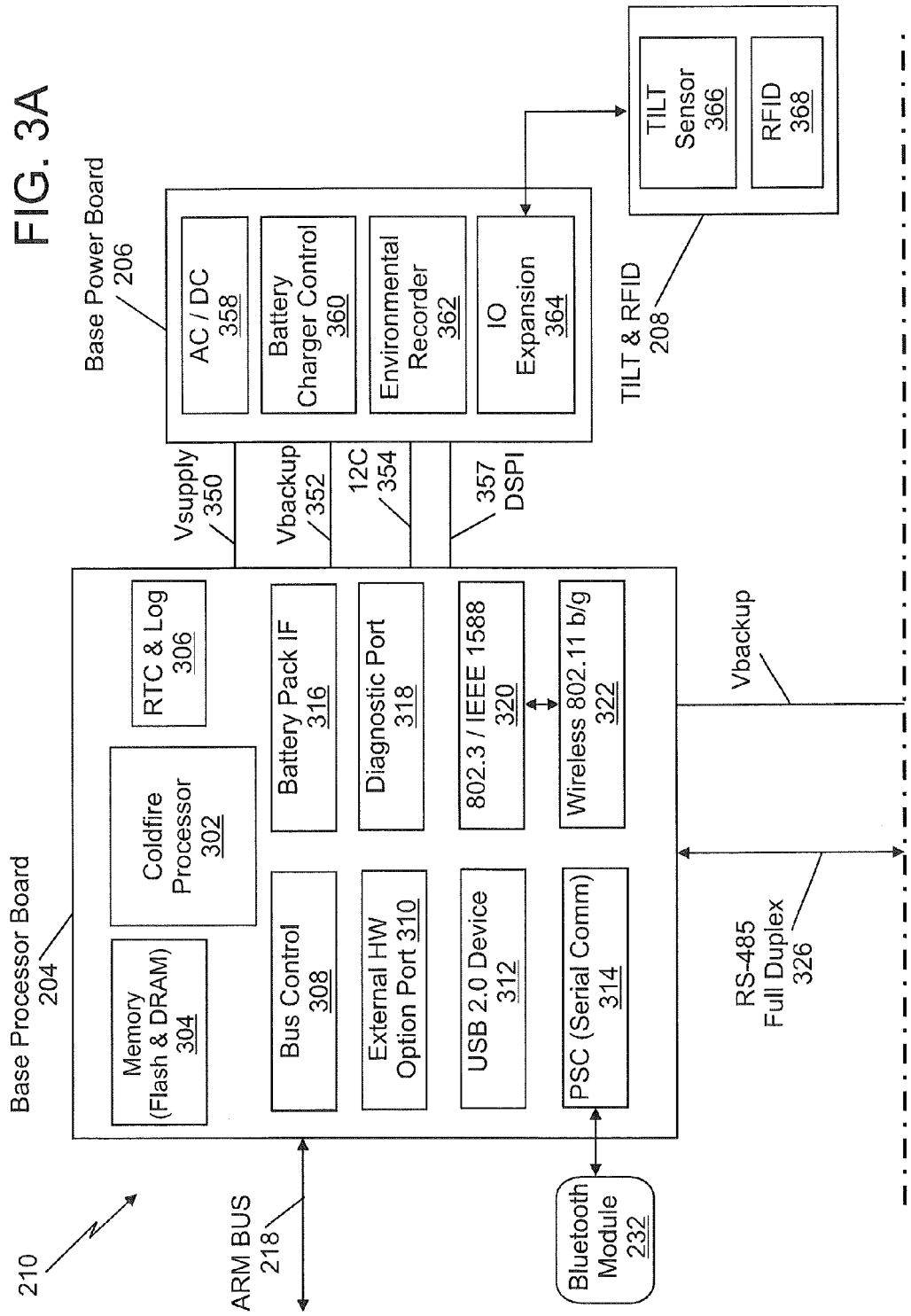

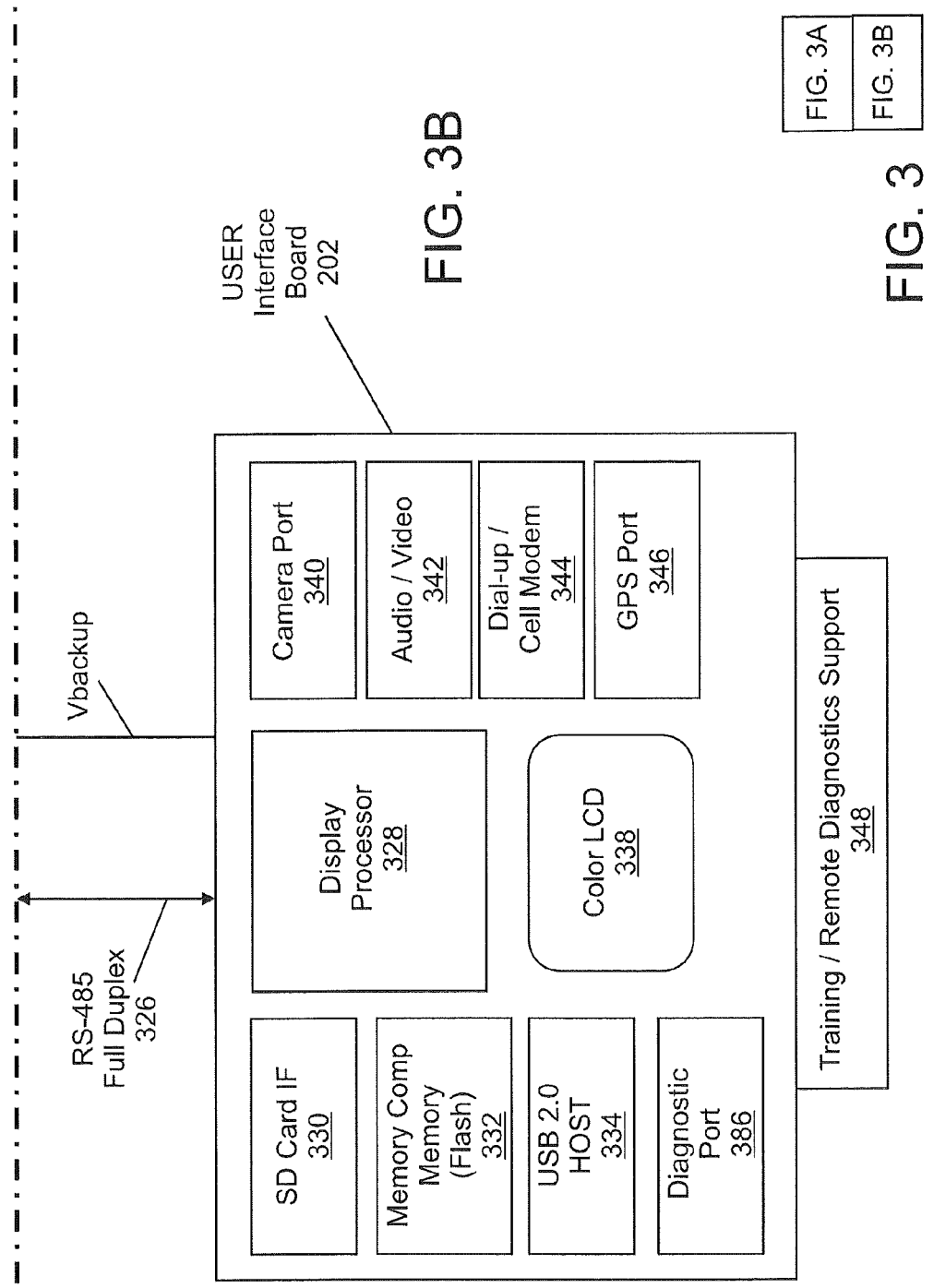

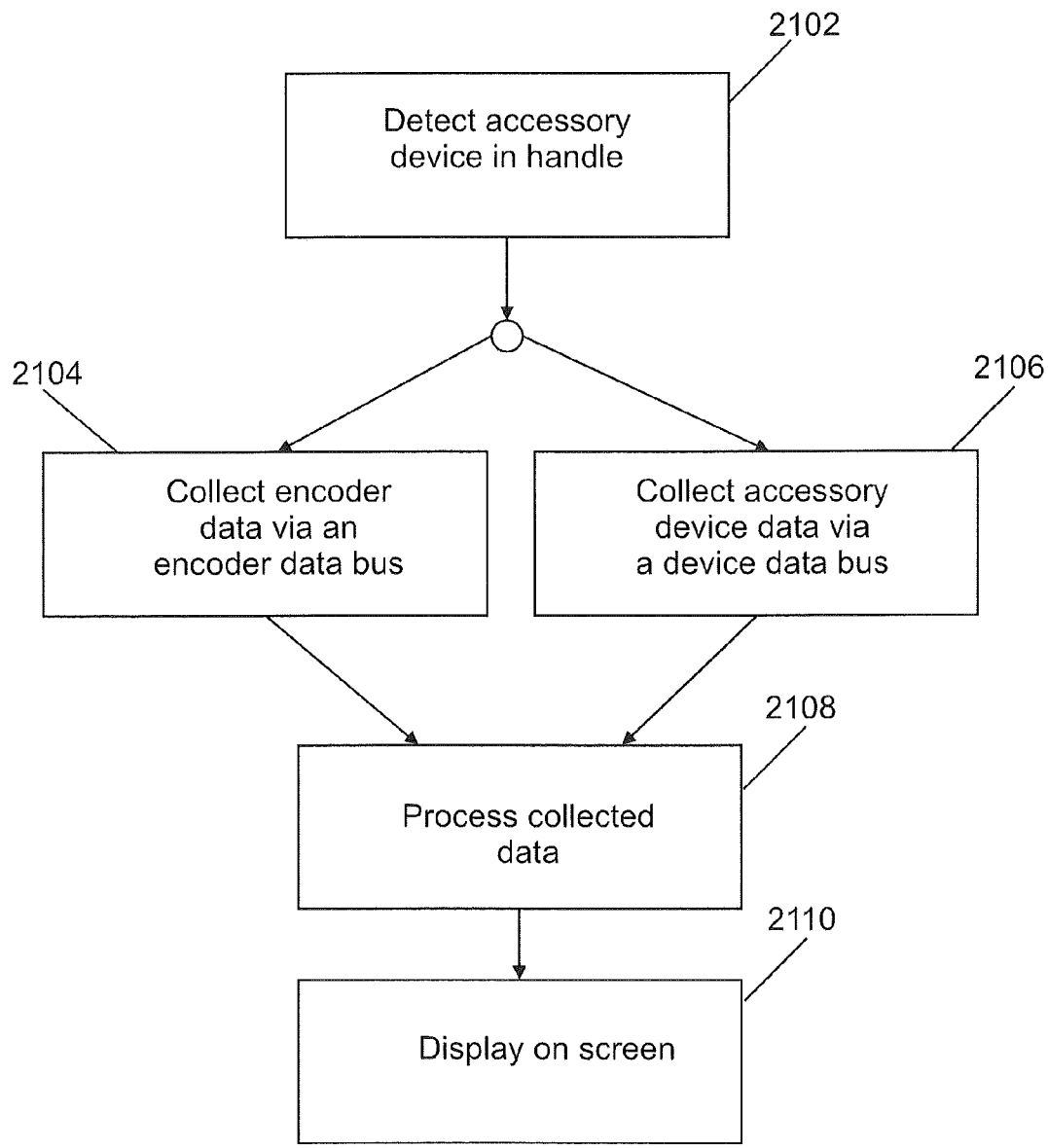

PORTABLE ARTICULATED ARM COORDINATE MEASURING MACHINE WITH MULTI-BUS ARM TECHNOLOGY

CROSS-REFERENCE TO RELATED APPLICATIONS

The present application claims the benefit of provisional application No. 61/296,555 filed Jan. 20, 2010, provisional application No. 61/355,279 filed Jun. 16, 2010, and provisional application No. 61/351,347 filed on Jun. 4, 2010, the contents of which are hereby incorporated by reference in their entirety.

BACKGROUND

The present disclosure relates to a coordinate measuring machine, and more particularly to a portable articulated arm coordinate measuring machine having multiple independent buses.

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611,147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

In contemporary AACMMs, measurement data, including encoder data, is collected and transmitted along an arm bus located in the articulated arm CMM. A drawback to the use of a single bus is that characteristics of the bus, such as bus speed and bus width, are dictated by requirements of the encoders and the encoder data. Another drawback to the use of a single bus is that the amount of non-encoder data that can be sent on the arm bus is limited by the remaining capacity on the arm bus after taking into account the capacity used by the encoder data. While existing AACMMs are suitable for their intended purposes, what is needed is a portable AACMM that has certain features of embodiments of the present invention to provide an enhanced arm bus.

SUMMARY OF THE INVENTION

An embodiment is a portable articulated arm coordinate measurement machine (AACMM). The AACMM includes a manually positionable articulated arm portion having opposed first and second ends, the arm portion including a plurality of connected arm segments, each of the arm segments including at least one position transducer for producing a position signal. The AACMM also includes a measurement device coupled to the first end and an electronic circuit. The electronic circuit is configured to: receive the position signal from the at least one position transducer, and to provide data corresponding to a position of the measurement device. The AACMM further includes a probe end disposed between the measurement device and the first end, an accessory device removably coupled to the probe end, an encoder data bus, and a first device data bus. The encoder data bus is coupled to the at least one transducer and the electronic circuit, and the encoder data bus is configured to send the position signal to the electronic circuit. The first device data bus is coupled to the accessory device and the electronic circuit. The first device data bus is configured to operate simultaneously with and independently of the encoder data bus for sending accessory device data from the accessory device to the electronic circuit.

Another embodiment is a portable AACMM that includes a manually positionable articulated arm portion having opposed first and second ends, the arm portion including a plurality of connected arm segments, each of the arm segments including at least one position transducer for producing a position signal. The AACMM also includes a measurement device coupled to the first end and an electronic circuit. The electronic circuit is configured to: receive the position signal from the at least one position transducer, and to provide data corresponding to a position of the measurement device. The AACMM further includes a probe end disposed between the measurement device and the first end, an encoder data bus, and a first device data bus. The encoder data bus is coupled to the at least one transducer and the electronic circuit, and the encoder data bus is configured to send the position signal to the electronic circuit. The first device data bus is coupled to the measurement device and the electronic circuit. The first device data bus is configured to operate simultaneously with and independently of the encoder data bus.

A further embodiment is a method of operating a portable AACMM. The method includes receiving a position signal via an encoder data bus. The receiving is by an electronic circuit on the portable AACMM. The portable AACMM includes a manually positionable articulated arm portion having opposed first and second ends, the arm portion including a plurality of connected arm segments, and each arm segment including at least one position transducer for producing the position signal. The portable AACMM also includes: a measurement device coupled to the first end; a probe end disposed between the measurement device and the first end; an accessory device removably coupled to the probe end; the electronic circuit; the encoder data bus in communication with the at least one position transducer and the electronic circuit; and a device data bus in communication with the accessory device and the electronic circuit. Accessory device data is received at the electronic circuit. The accessory device data is received from the accessory device via the device data bus. The device data bus operates simultaneously with and independently of the encoder data bus.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including FIGS. 1A and 1B, are perspective views of a portable articulated arm coordinate measuring machine (AACMM) having embodiments of various aspects of the present invention therewithin;

FIG. 3, including FIGS. 3A and 3B taken together, is a block diagram describing detailed features of the electronic data processing system of FIG. 2 in accordance with an embodiment;

FIG. 14, including

FIG. 15, including

FIG. 21 is a process flow of simultaneous data capture on an encoder data bus and a device data bus in accordance with an embodiment.

DETAILED DESCRIPTION

An embodiment of the present invention provides an enhanced AACMM that includes multiple arm buses operating independently of each other for transmitting data within the AACMM.

Figure 1B:
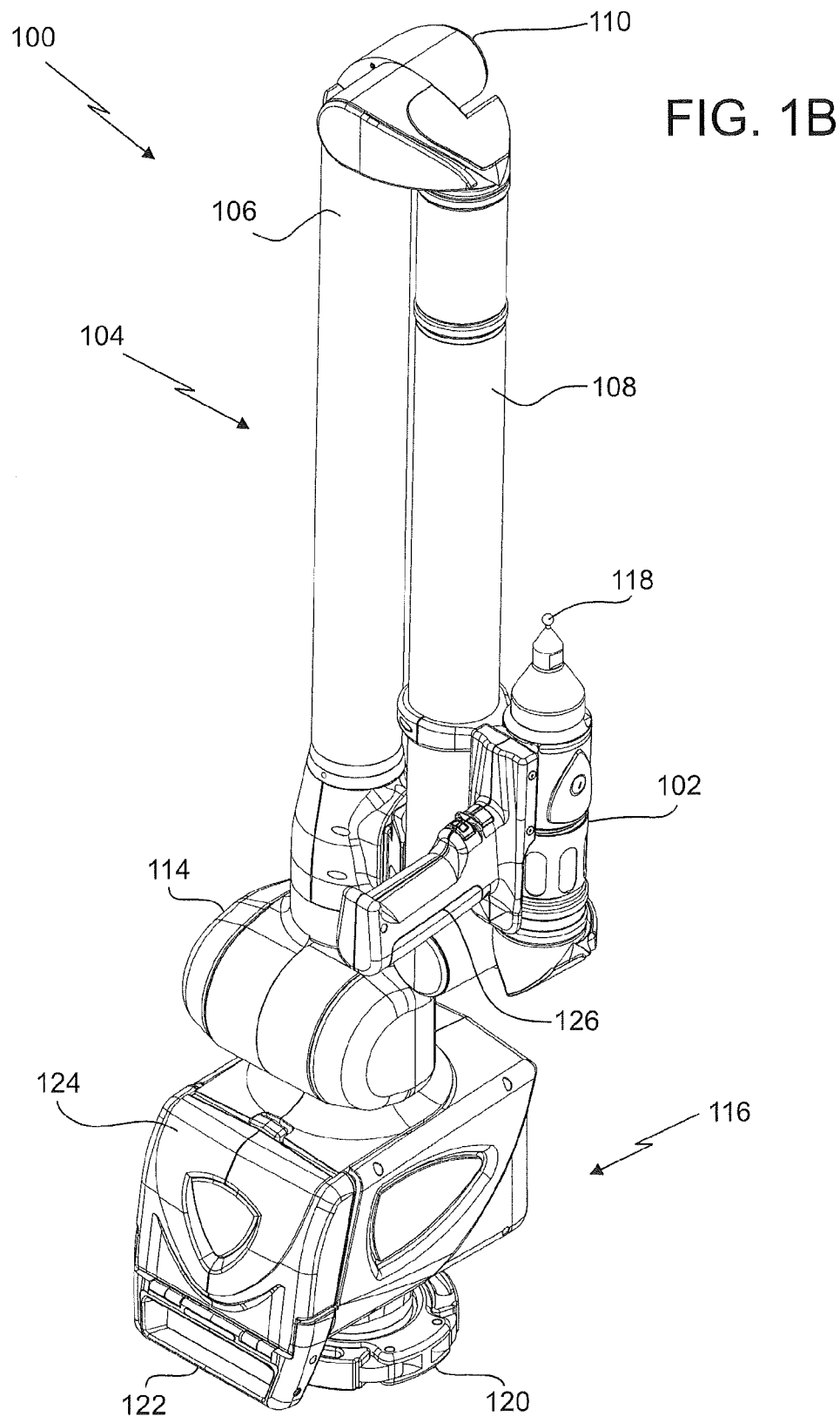

FIGS. 1A and 1B illustrate, in perspective, an AACMM 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to the removable handle 126 on the AACMM 100). The electronics that support these peripheral hardware devices or features may be located in each of the bearing cartridge groupings 110, 112, 114 located within the portable AACMM 100.

Figure 2A:
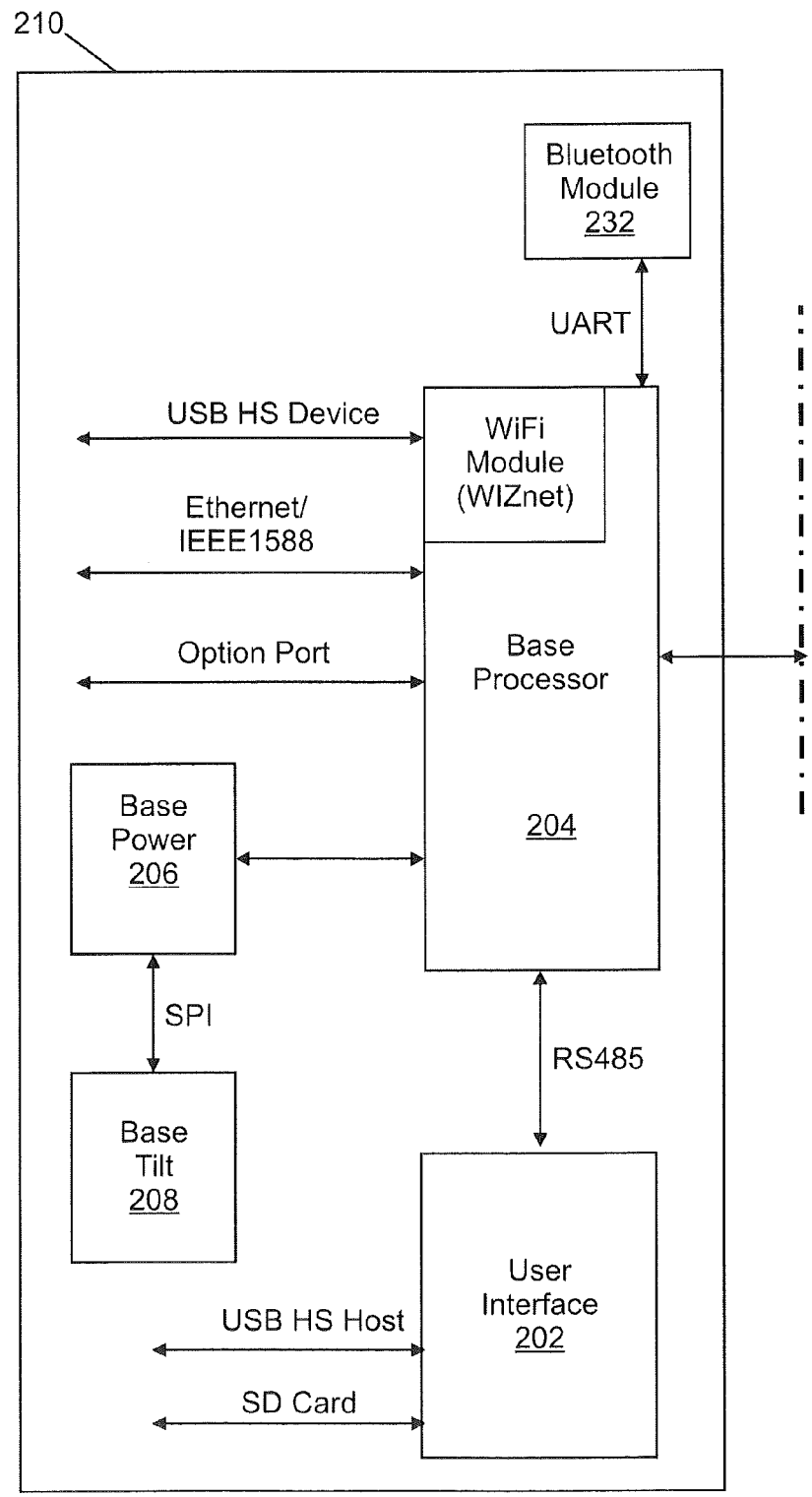
FIG. 2, including FIGS. 2A-2D taken together, is a block diagram of electronics utilized as part of the AACMM of FIG. 1 in accordance with an embodiment.
Figure 2B:
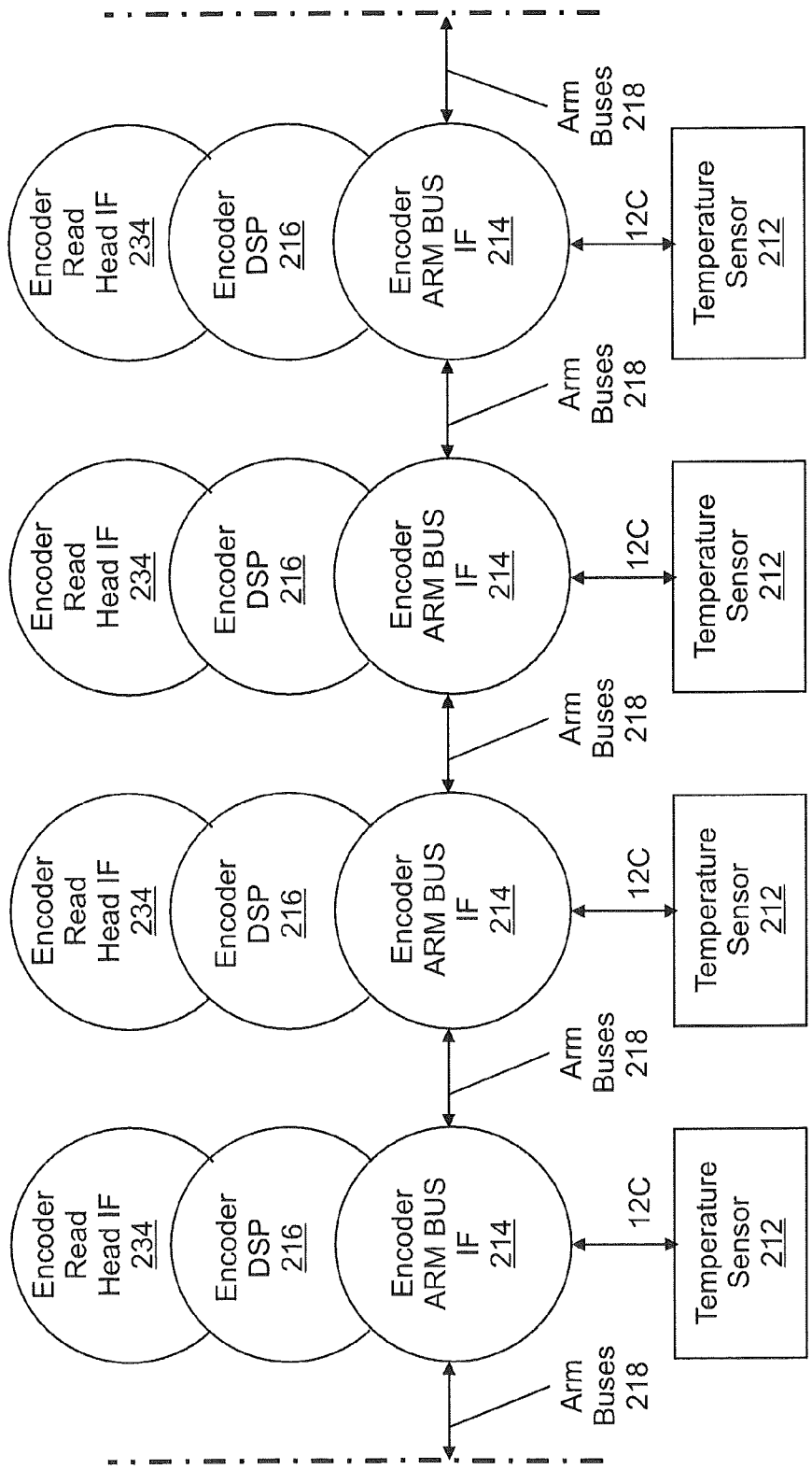
Figure 2C:
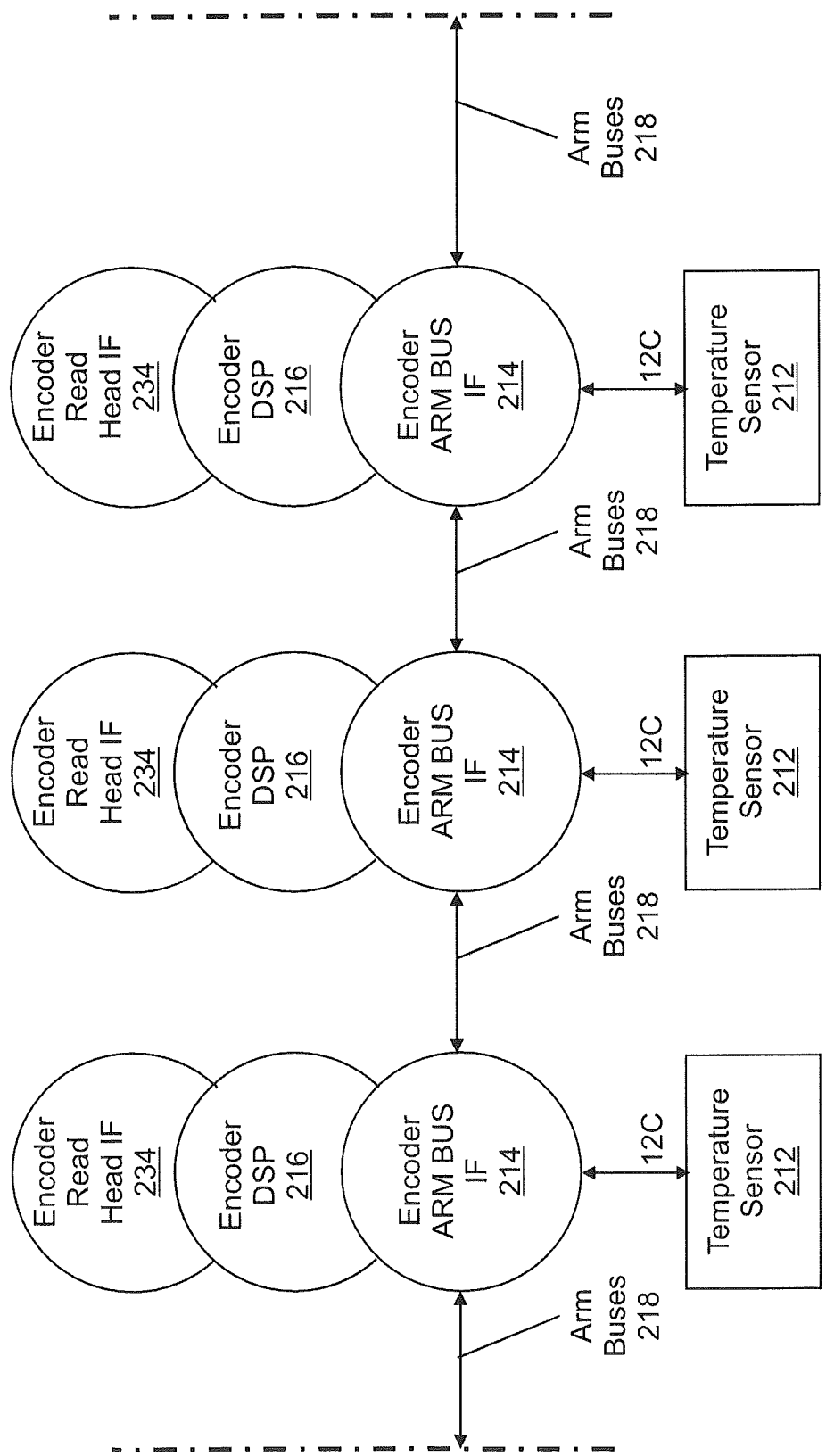
Figure 2D:
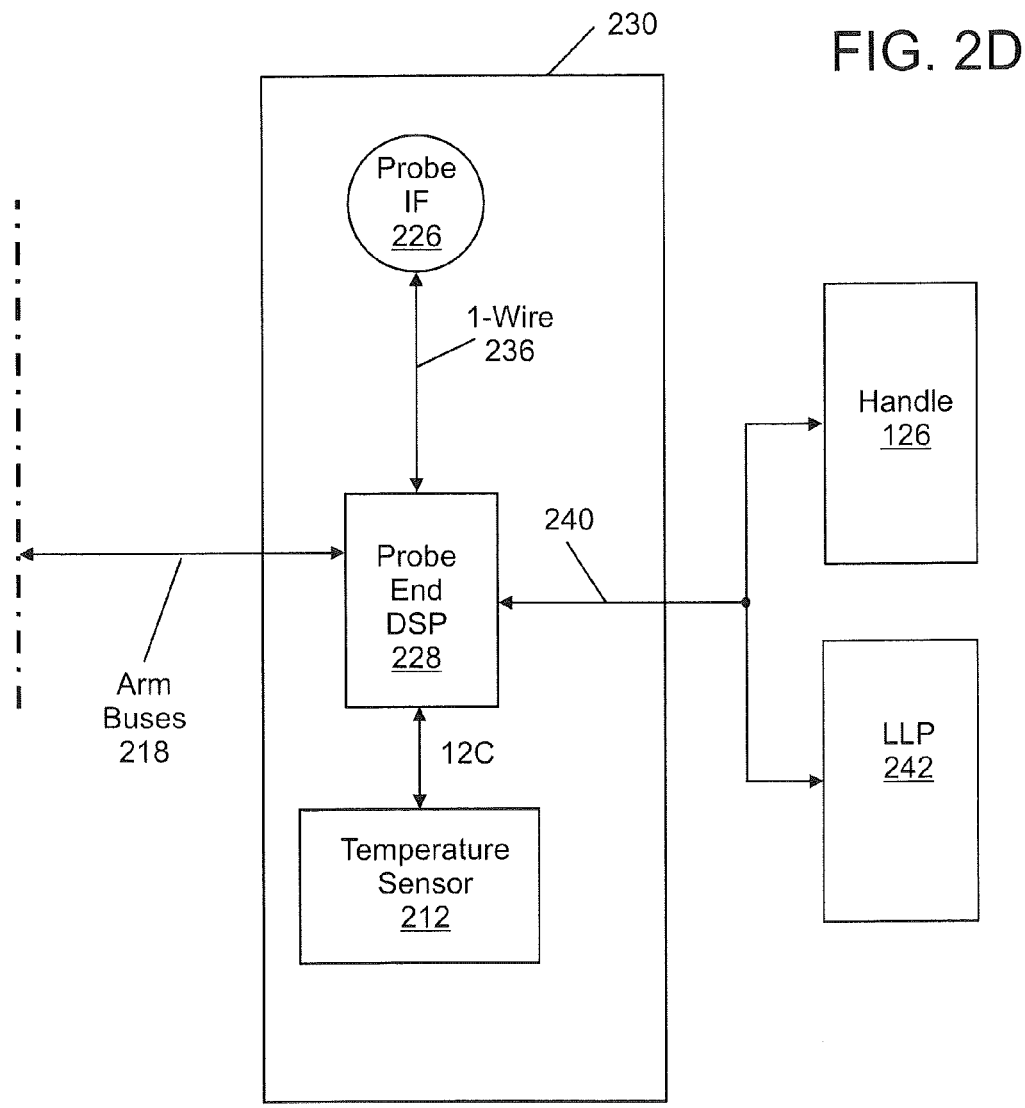
Figure 2:
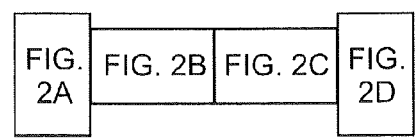
Figure 4:
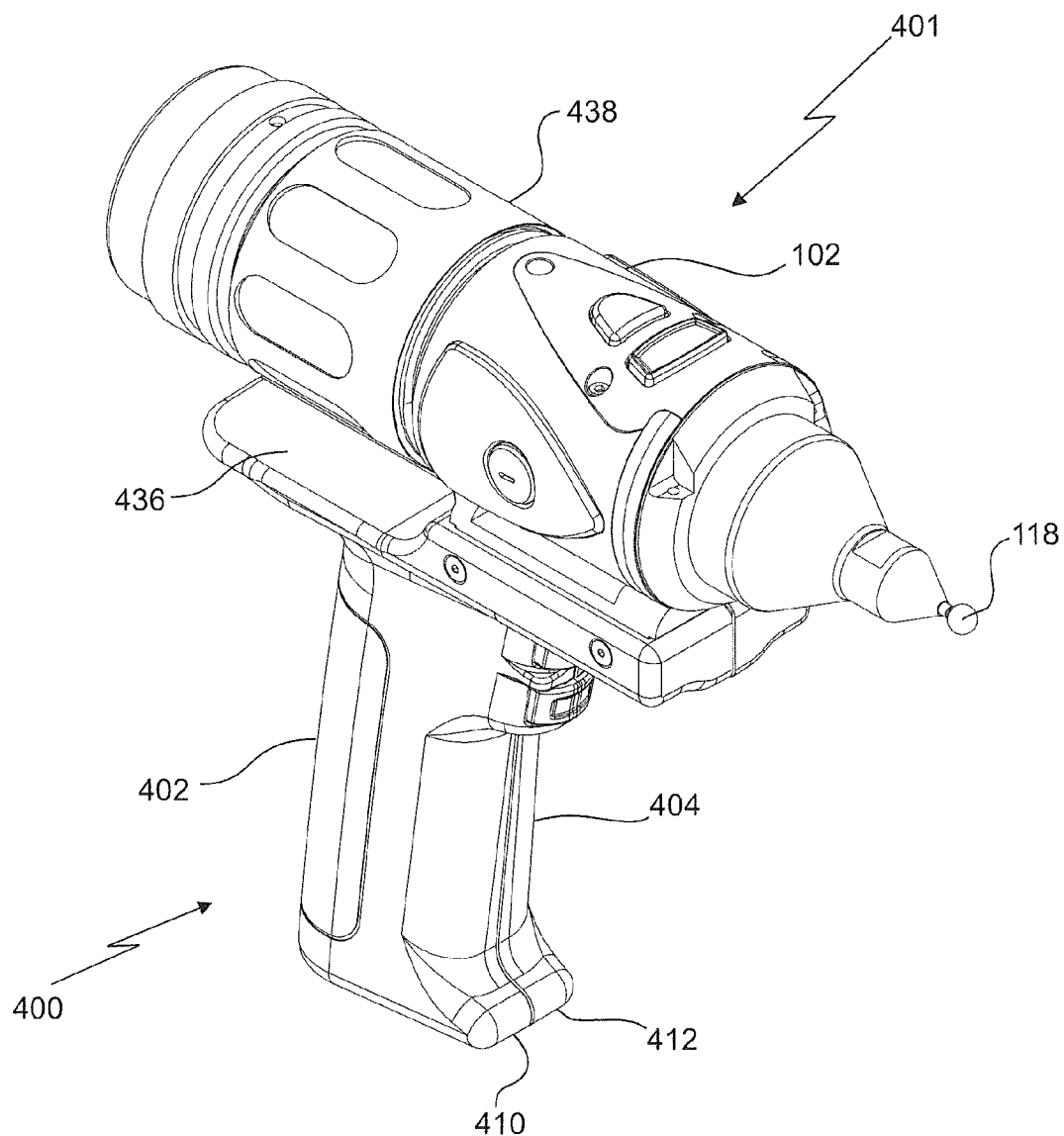
FIG. 4 is an isometric view of the probe end of the AACMM of FIG. 1.

FIG. 2 is a block diagram of electronics utilized in an AACMM 100 in accordance with an embodiment. The embodiment shown in FIG. 2 includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

As shown in FIG. 2, the electronic data processing system 210 is in communication with the aforementioned plurality of encoder systems via one or more arm buses 218. In the embodiment depicted in FIG. 2, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Also shown in FIG. 2 are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 356. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 7:
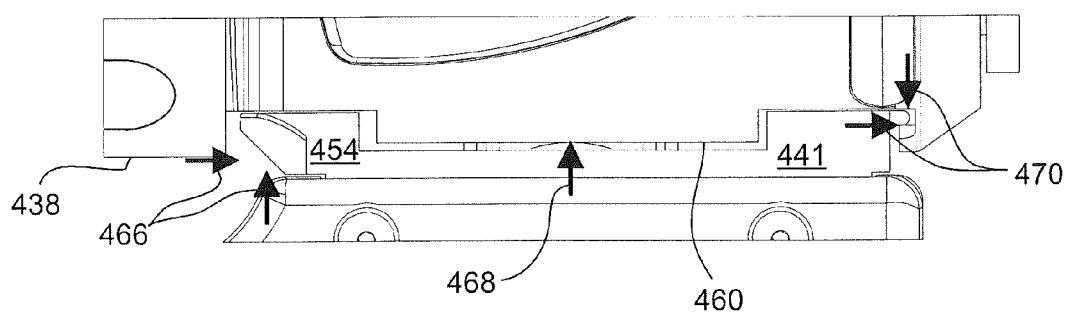
FIG. 7 is an enlarged partial side view of the interface portion of the probe end of FIG. 6.
Figure 8:
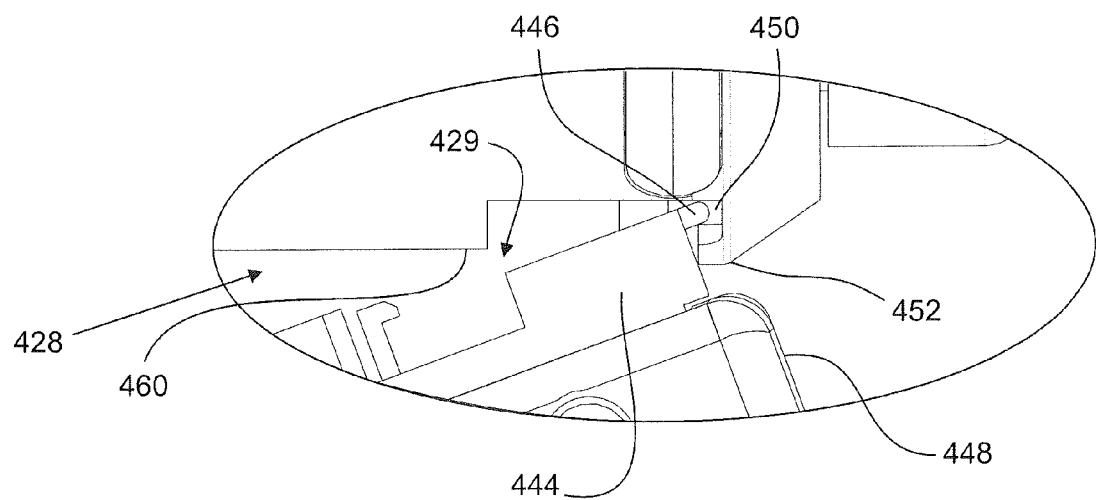
FIG. 8 is another enlarged partial side view of the interface portion of the probe end of FIG. 5.
Figure 9:
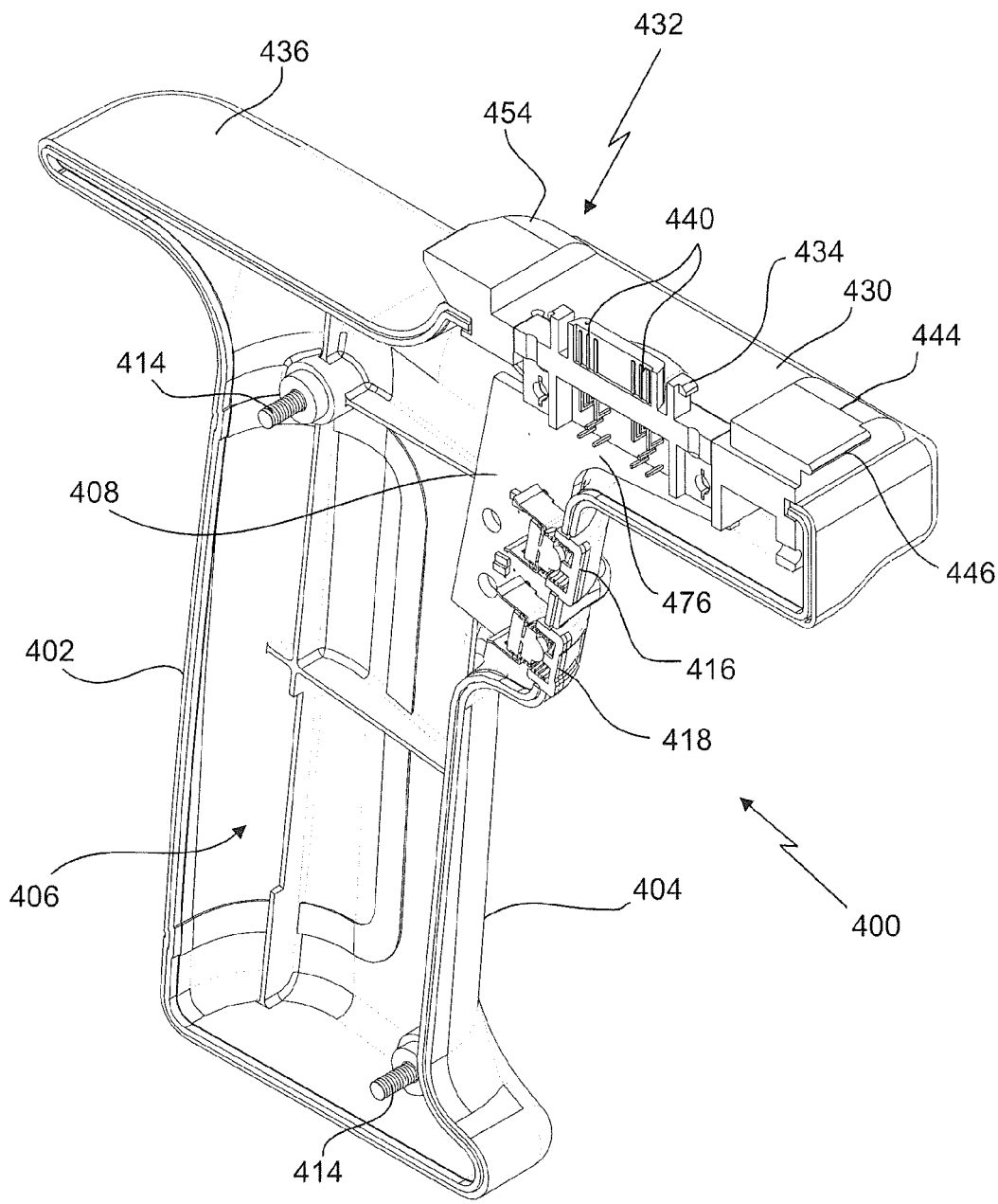
FIG. 9 is an isometric view partially in section of the handle of FIG. 4.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. As will be discussed in more detail below, this offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
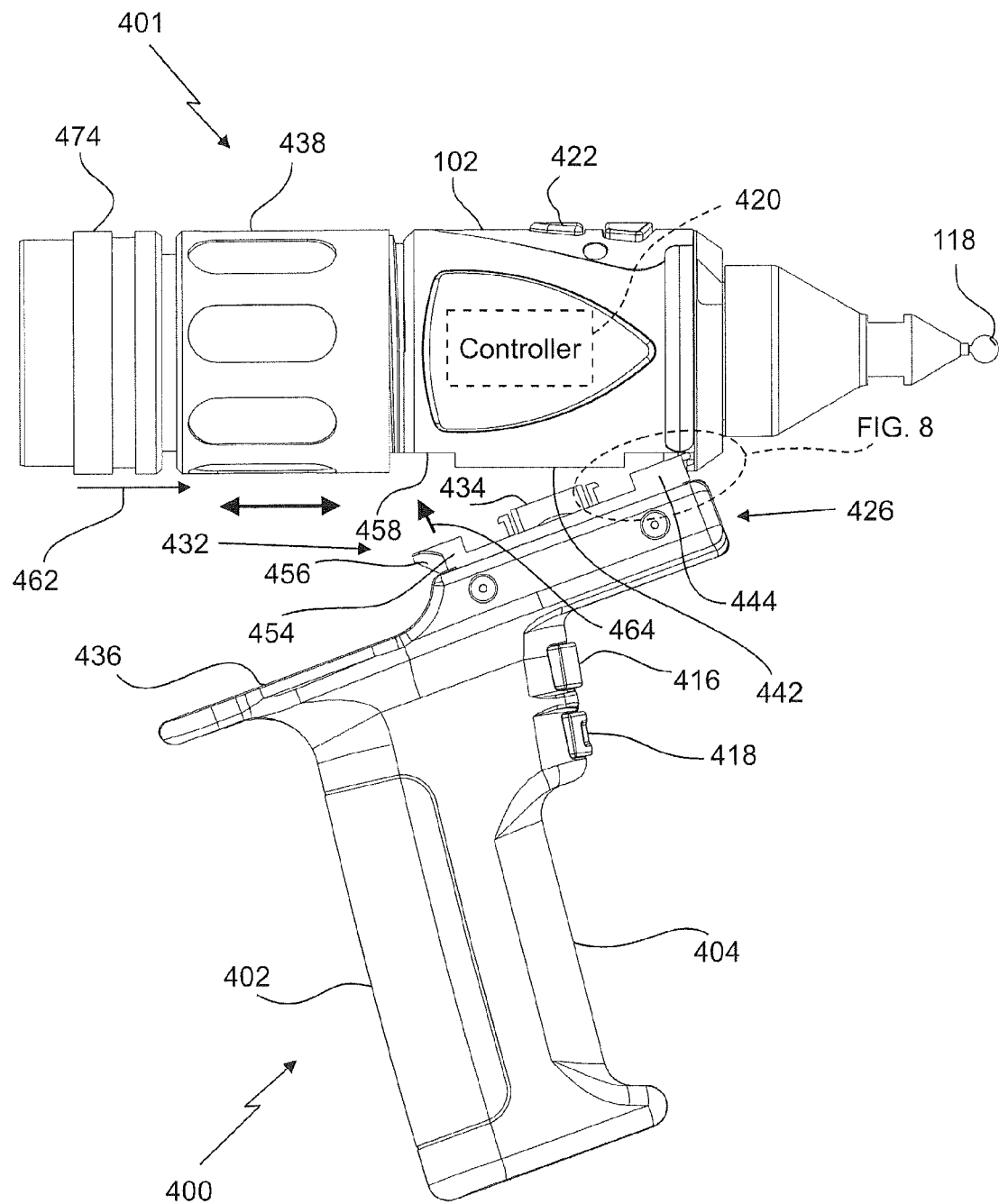
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
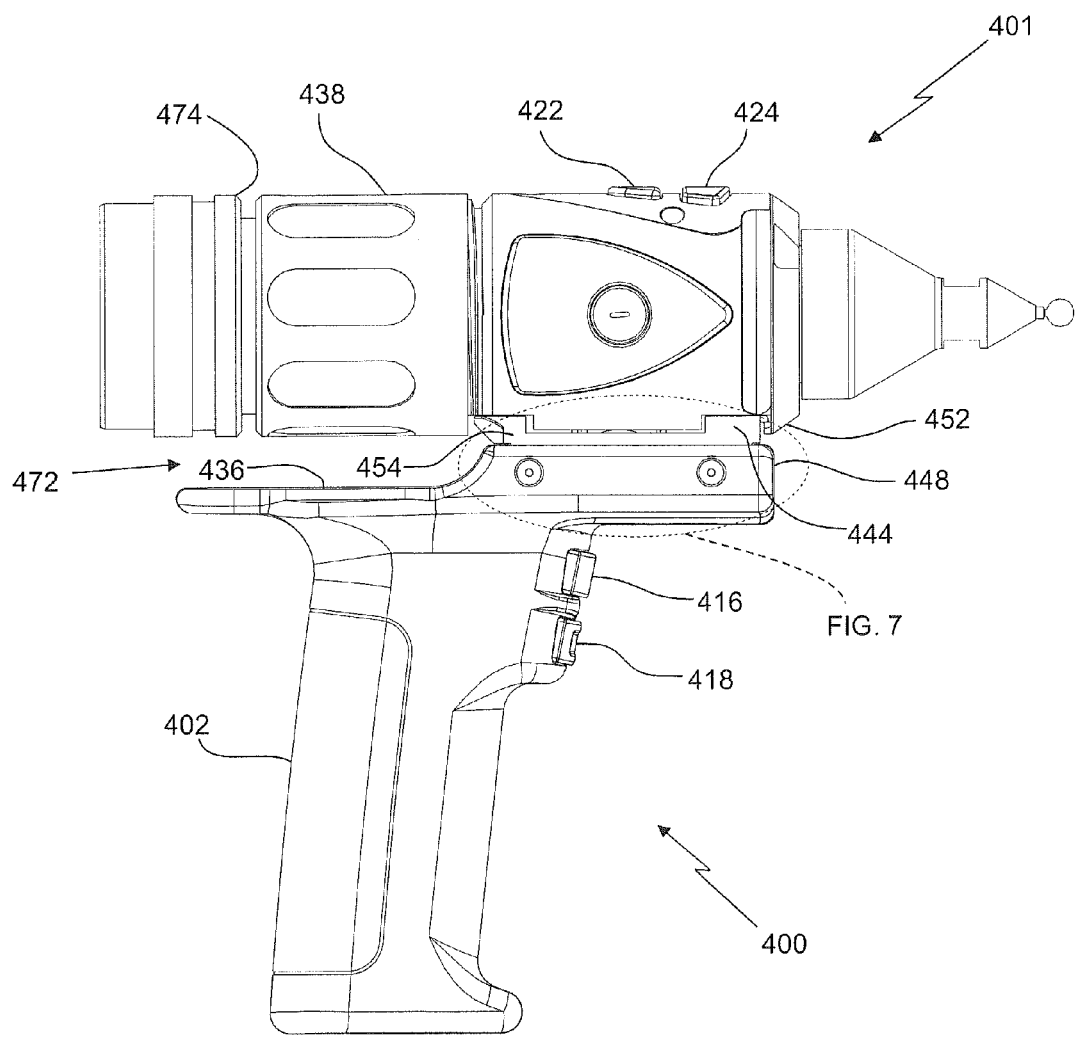
FIG. 6 is a partial side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protects the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. This provides advantages in simplifying the requirements of controller 420 and allows for upgraded or increased functionality through the addition of accessory devices.

Figure 10:
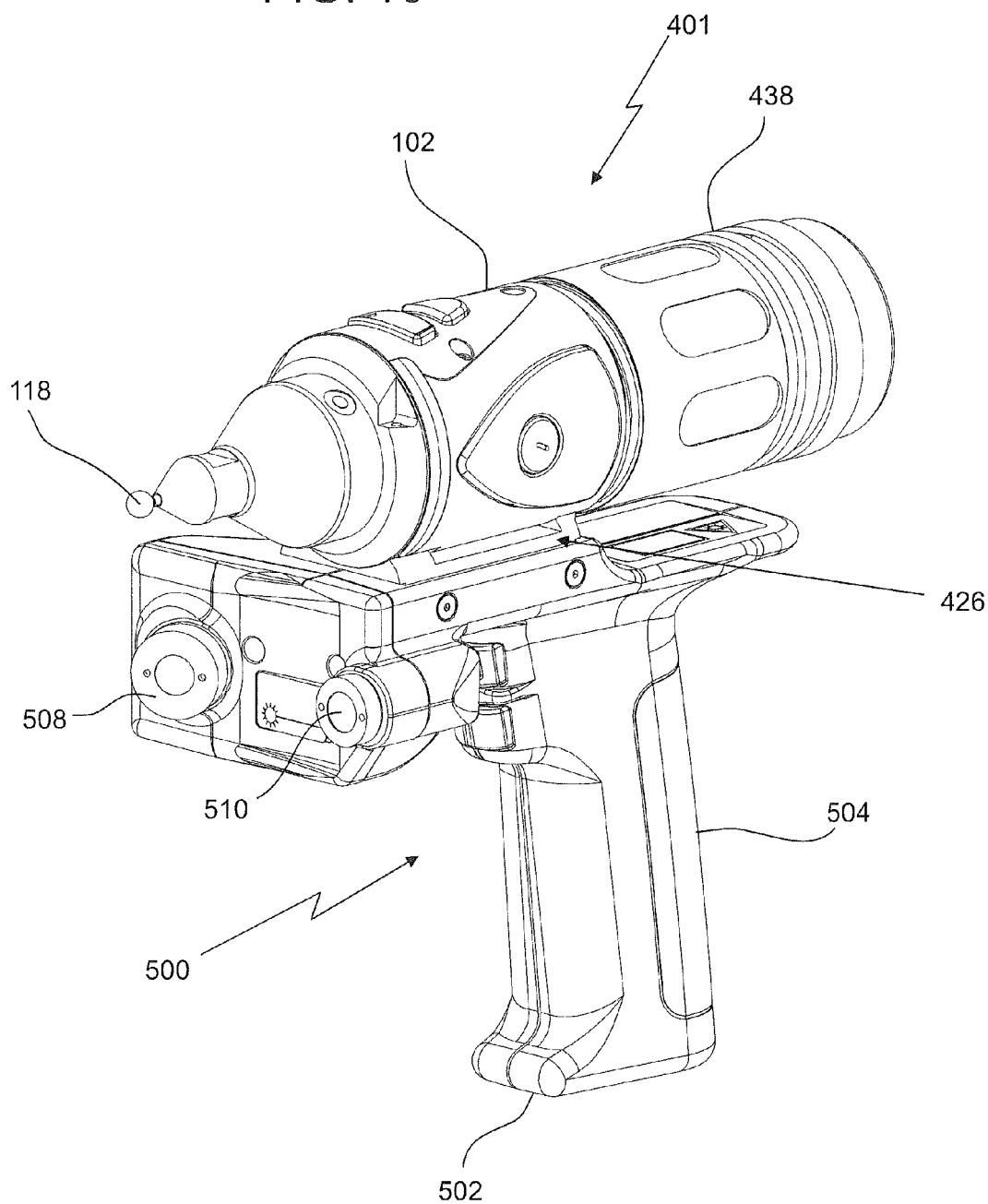
FIG. 10 is an isometric view of the probe end of the AACMM of FIG. 1 with a laser line probe device attached.
Figure 11:
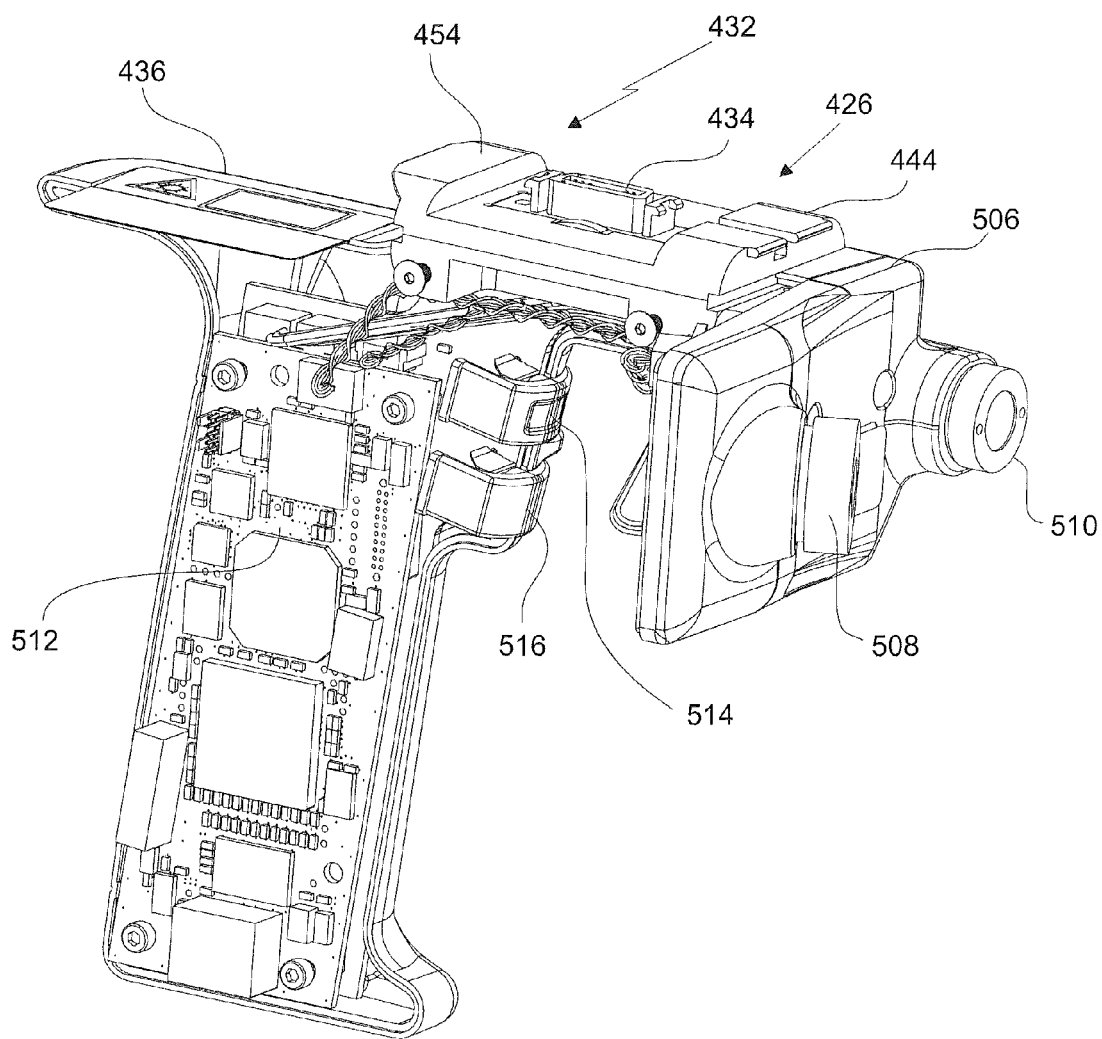
FIG. 11 is an isometric view partially in section of the laser line probe of FIG. 10.

Referring to FIGS. 10-11, embodiments of the present invention provide advantages to camera, signal processing, control and indicator interfaces for a laser line probe (LLP) scanning device 500. The LLP 500 includes an enclosure 502 with a handle portion 504. The LLP 500 further includes an interface 426 on one end that mechanically and electrically couples the LLP 500 to the probe housing 102 as described herein above. The interface 426 allows the LLP 500 to be coupled and removed from the AACMM 100 quickly and easily without requiring additional tools. Adjacent the interface 426, the enclosure 502 includes a portion 506 that includes an optical device 510, such as a laser device for example, and a sensor 508. The sensor 508 may be charged-coupled device (CCD) type sensor or a complementary metal-oxide-semiconductor (CMOS) type sensor for example. In the exemplary embodiment, the optical device 510 and sensor 508 are arranged at an angle such that the sensor 508 may detect reflected light from the optical device 510 at a desired focal point. In one embodiment, the focal point of the optical device 510 and the sensor 508 is offset from the probe tip 118 such that the LLP 500 may be operated without interference from the probe tip 118. In other words, the LLP 500 may be operated with the probe tip 118 in place. Further, it should be appreciated that the LLP 500 is substantially fixed relative to the probe tip 118 and forces on the handle portion 504 may not influence the alignment of the LLP 500 relative to the probe tip 118. In one embodiment, the LLP 500 may have an additional actuator (not shown) that allows the operator to switch between acquiring data from the LLP 500 and the probe tip 118.

The optical device 510 and sensor 508 are electrically coupled to a controller 512 disposed within the enclosure 502. The controller 512 may include one or more microprocessors, digital signal processors, memory and signal conditioning circuits. Due to the digital signal processing and large data volume generated by the LLP 500, the controller 512 may be arranged within the handle portion 504. The controller 512 is electrically coupled to the arm buses 218 via electrical connector 434. The LLP 500 further includes actuators 514, 516 which may be manually activated by the operator to initiate operation and data capture by the LLP 500.

Figure 12:
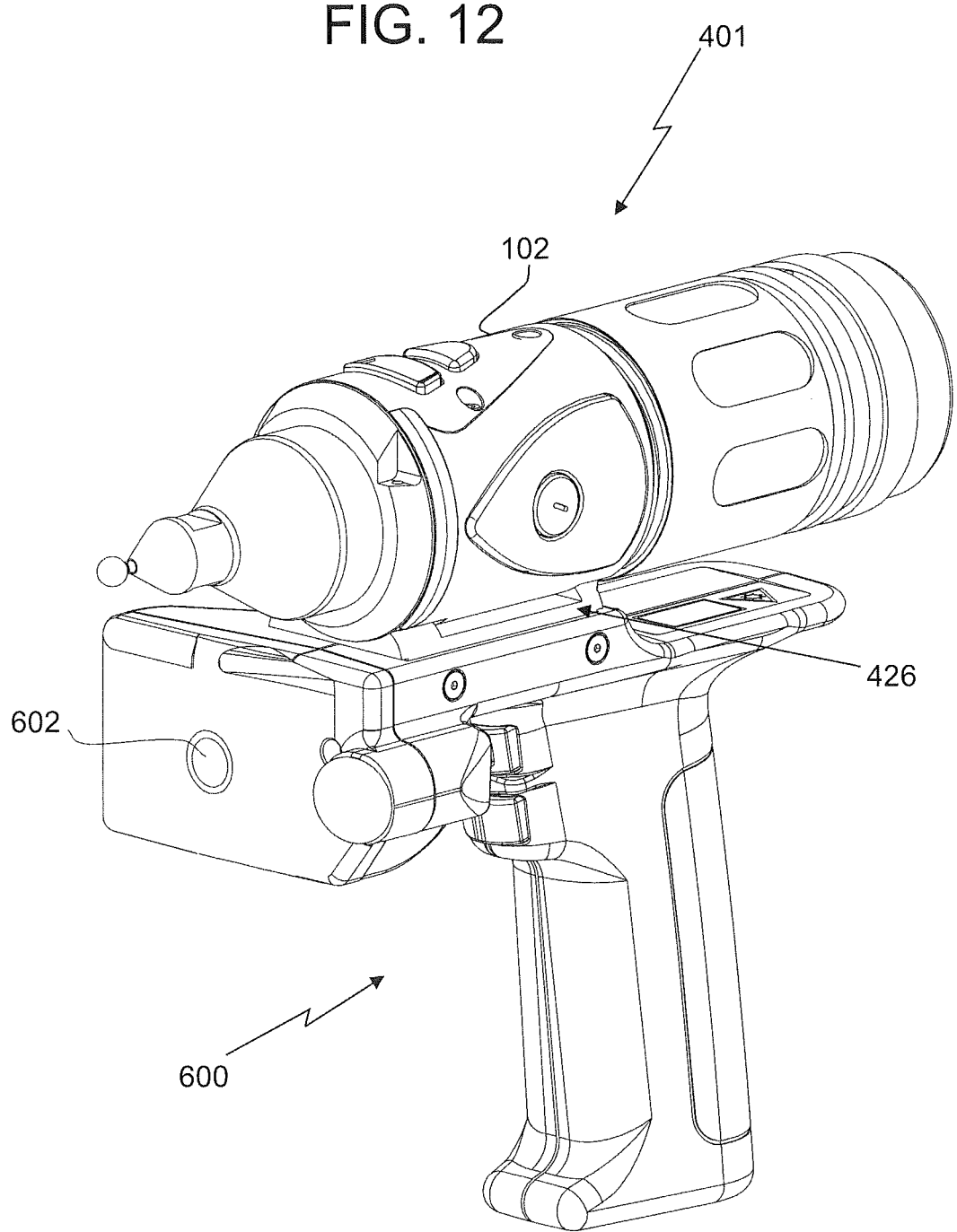
FIG. 12 is an isometric view of the probe end of the AACMM of FIG. 1 with another removable device attached.

In other embodiments of the present invention, the device 600 (FIG. 12) coupled to the AACMM 100 may include a functional device 602. Depending on the type of device 600, the functional device 602 may be a still camera, a video camera, a bar-code scanner, thermal scanner, a light source (e.g. a flashlight), or an image projector. In one embodiment, the functional device 602 may include a retroreflector holder such as that described in commonly-assigned U.S. Pat. No. 7,804,602 entitled "Apparatus and Method for Relocating an Articulating-Arm Coordinate Measuring Machine" which is incorporated herein in its entirety. In yet another embodiment, the functional device 602 may include an ultrasonic probe such as that described in commonly-owned U.S. Pat. No. 5,412,880 entitled "Method of Constructing a 3-Dimensional Map of a Measurable Quantity Using Three Dimensional Coordinate Measuring Apparatus" which is incorporated by reference herein in its entirety. The device 600 includes an interface 426 allowing a device to be electrically and mechanically coupled to the probe housing 102. Device 600 further includes a controller electrically connected to the functional device 602. The controller is arranged in asynchronous bidirectional communication with the electronic data processing system 210. The bidirectional communication connection may be wired (e.g. via arm bus 218), wireless (e.g. Bluetooth or IEEE 802.11). In one embodiment, the communications connection is a combination of wired and wireless connections wherein a first signal type is transmitted via a wired connection via controller 420 and a second signal type is transmitted via a wireless connection. In an embodiment wherein the functional device 602 includes multiple functions such as an image projector and a laser line probe, The image (e.g. CAD) data may be sent via a wireless connection to the image projector while the data aquired by the LLP image sensor is sent via a wired connection. It should be appreciated that the integration of these devices may provide advantages in allowing the operator to acquire measurements faster and with a higher degree of reliability. For example, with the still camera or video camera device attached, the operator may record an image or images of the object being measured with the device. These images may be displayed on display 328 or incorporated into an inspection report for example. In one embodiment, the operator may place graphical markers on the displayed image to define measurement points via the user interface board 202. In this way, the operator can later recall the marked up image from memory and quickly see where to make measurements. In other embodiments, a video is captured of the object being measured. The video is then replayed via the user interface board 202 to assist the operator in repeating multiple measurements on the next object to be inspected or as a training tool for new operators.

Figure 13:
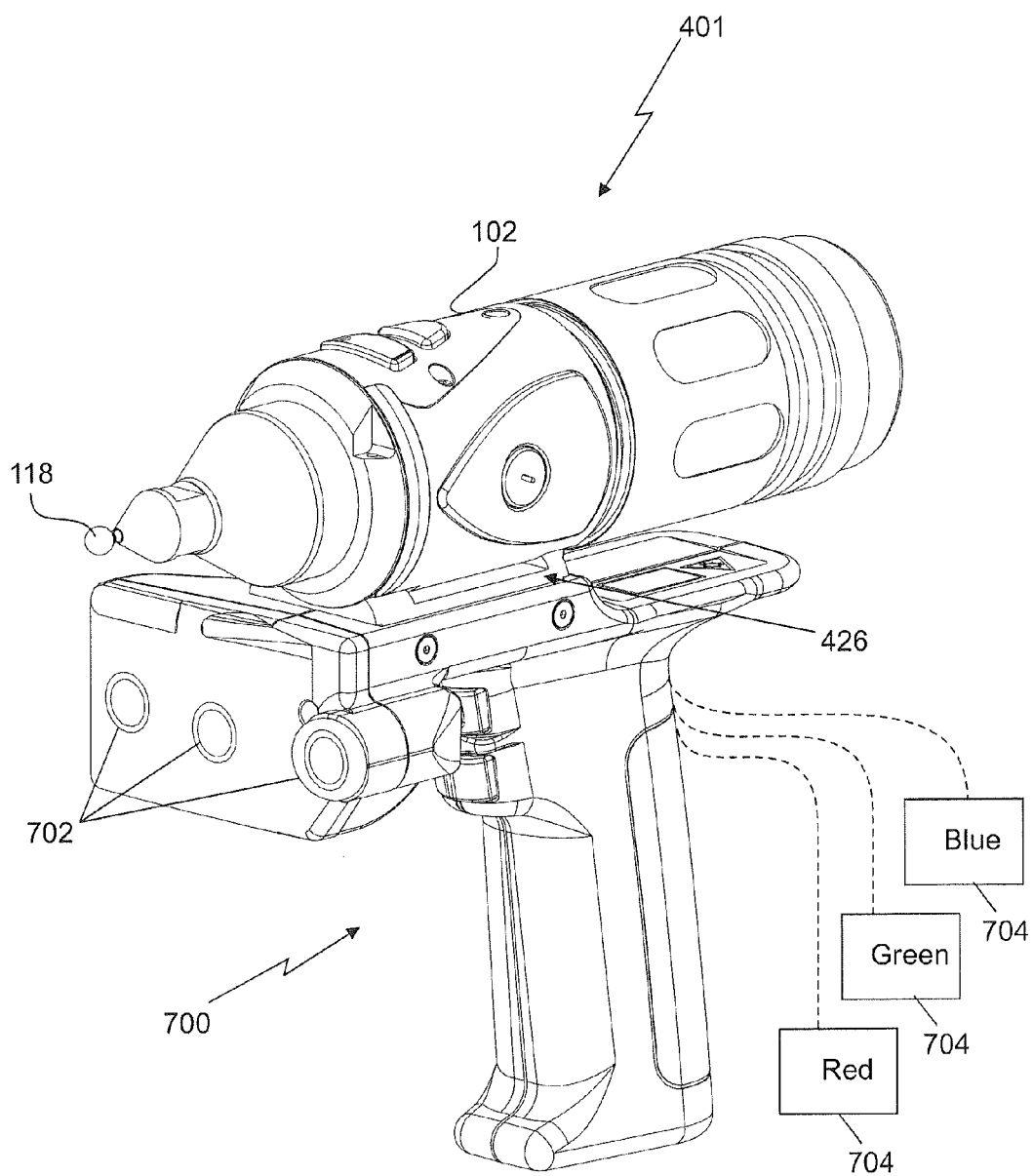
FIG. 13 is an isometric view of the probe end of the AACMM of FIG. 1 with a paint spray device attached.
Figure 14A:
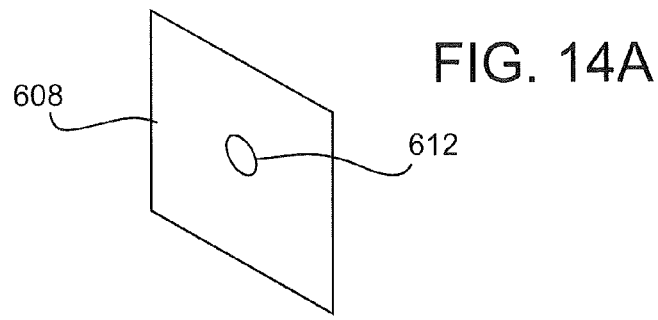
FIG. 14A-FIG. 14C are views of a projected image that is may be adjusted to remain aligned with a part feature as a function of the arm position and orientation, in accordance with an embodiment of the present invention.
Figure 14B:
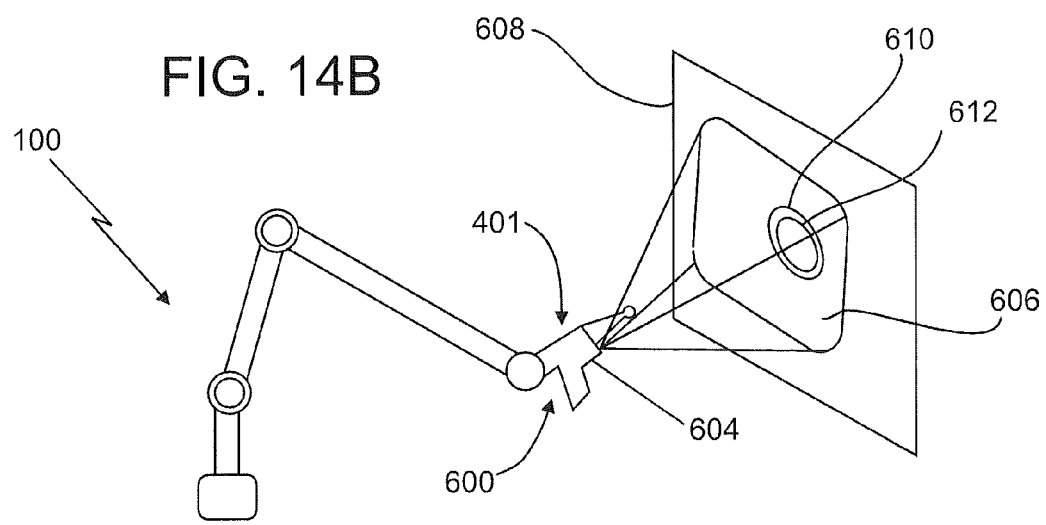
Figure 14C:
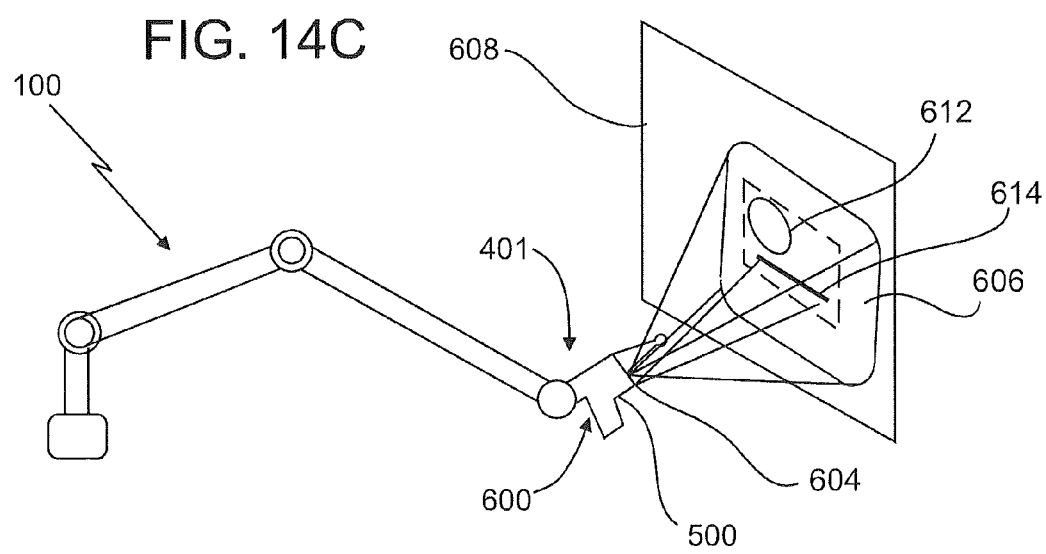

In yet another embodiment, the device may be a paint spray device 700 (FIG. 13). The paint spray device 700 includes an interface 426 that electrically and mechanically couples the paint spray device 700 to the probe housing 102. In this embodiment, the device 700 includes a controller arranged in communication with electronic data processing system 210. The communication connection may be wired (e.g. via arm bus 218), wireless (e.g. Bluetooth or IEEE 802.11), or a combination of wired and wireless connections. The device 700 controller receives a signal from the electronic data processing system 210 and selectively sprays one or more colors from one or more spray nozzles 702 that are each connected to a reservoir 704 (e.g. red, green, blue) each with a single color of paint. It should be appreciated that the spray nozzles 702 may also be an inkjet type of spray mechanism that deposits droplets of paint, ink, pigments or dies onto a surface. The inkjet nozzles may include but are not limited to continuous inkjets, thermal inkjets, and piezoelectric inkjets Since the electronic data processing system 210 knows the position and orientation of the probe housing 102, the device may receive commands to spray a particular color at a particular location to match a desired image stored in memory. Thus, an image or picture may be reproduced by the device 700 as the operator moves the device 700 across the desired surface (e.g. a wall). This embodiment may also provide advantages in manufacturing environments to create layout markings on an article, such as sheet metal for example.

It should be appreciated that while FIG. 13 illustrates the reservoirs 704 as being external to the AACMM 100, this is for exemplary purposes and the claimed invention should not be so limited. In one embodiment, the reservoirs 704 are disposed in the handle of the device 700. In another embodiment, the reservoirs 704 are arranged in the base 116 and conduits extend through the arm 104 providing a system with no external wiring, tubes or conduits.

Referring now to FIG. 12 and FIG. 14-18, an embodiment is shown of a device 600 incorporating one or more image projectors 602. In accordance with embodiments of the present invention, one or more relatively small, commercially available projectors (e.g., "ultra miniature" or "pico" projectors) 604 may be mounted to, connected with, or otherwise attached to the probe end 401 of AACMM 100 or at other various positions thereon (e.g. opposite the handle, on an arm segment). In FIG. 14A-14D, the projector 604 is shown mounted to the device 600 adjacent to the handle 126. However, the projector 604 may be mounted anywhere on the AACMM 100, and may be mounted to a laser line probe, if utilized in conjunction with the AACMM 100. The projector 604 may contain some amount of processing capability. In an embodiment, the projector 604 is connected with, or in communication with, the electronic data processing system 210. As such, the projector 604 may be provided with visual guidance information or data (e.g., an image 606) that the projector 604 then projects onto the part or object 608 to be measured or otherwise worked on by an operator of the AACMM 100, as shown in "Position 1" of FIG. 14B.

Once the orientation of the part 608 is aligned within the coordinate system of the AACMM 100, the scale of the projected image 606 and its perspective can be synchronized to the movement of the AACMM 100 using the positional data of the arm 104. The image 606 projected on the part 608 can be adjusted by a processor associated with the projector 604 or via the electronic data processing system 210 as a function of the position of the probe end 401, such that as the device 600 is moved, the image 606 projected on the part 608 is stationary, changing both in scale and orientation to present a stable image to the operator. This can be seen in "Position 2" of FIG. 14C. As an example, a colored (e.g. green) circle 610 could be projected to align with a hole 612 in the part to be measured. As the probe angle or distance relative to the part 608 is changed, the position of the circle 610 in the projected image 606 changes, yet the circle 610 remains "locked" in position over the hole 612, and remains the same size as the hole 612. This is comparable to locking on and tracking a target. An advantage of this configuration is that the operator does not need to look away from the part 608 at a computer screen, user interface or other visual display as the operator moves the AACMM 100.

Using projected imagery on the part 608 as opposed to simple grid lines in the prior art provides a wide range of projected information options, including but not limited to: (1) Color control—a red circle may change to green after completing a measurement successfully. The color of the marker or graphics may change to provide the highest visibility (contrast) for the color of the part 608. (2) Animations—markers, arrows, or other indicators may flash, changing frequency, alternately changing colors to start or finish an operation. (3) Text—messages, data, or dimensions can be projected on the part. A digital read-out normally displayed on the computer screen can be projected on the part 608. (4) CAD images—can be overlaid on parts, with notes, dimensions or other information. Features to be measured can be sequentially highlighted with color or animation. (5) Photographs—actual images of the part (as designed) can be projected onto the part to be measured, immediately indicating anything that is different, such as a missing hole or a feature in the wrong location. ("Projection with Guidance"; see FIG. 15A). (6) Range Indicator—for non-contact devices like LLP500, range indicators 614 can be projected onto the part surface 608. These can be animated, colored, and include text and/or data.

Figure 15A:
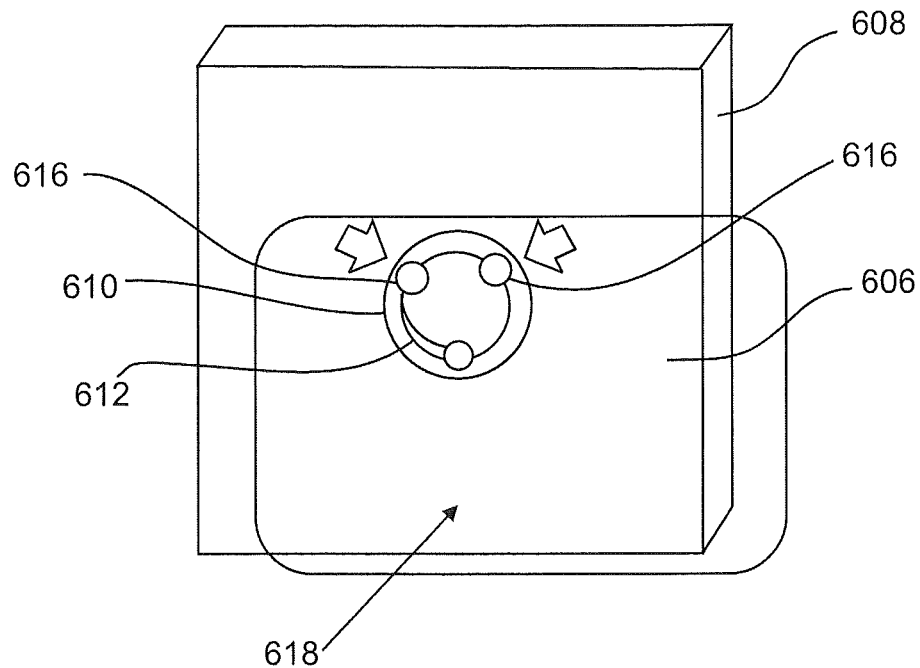
FIG. 15A-15B are views of a surface of a part with an image projected thereon, where the projected image contains probe guidance and status information.
Figure 15B:
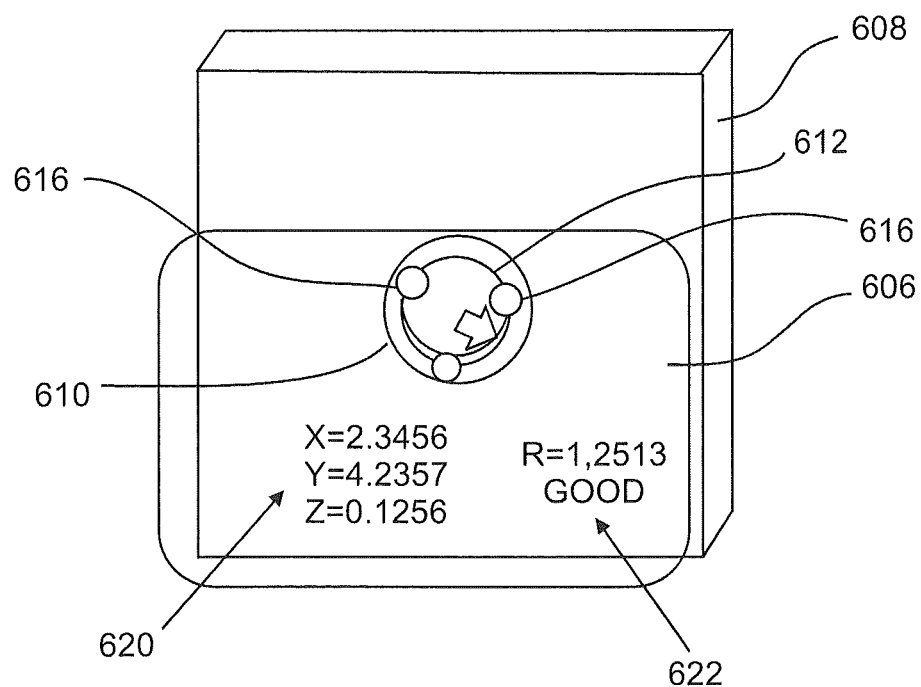

The AACMM 100 may also use the projector 604 to provide guidance to the operator as illustrated in FIG. 15A. The projector 604 generates an image on the part 608 highlighting the feature 612 where the measurements are to be taken with circle 610, while also overlaying indicators 616 where the measurement device 118 should acquire the measurement points. Textual instructions 618 may also be projected and overlaid on the part 608. After taking a measurement of a part or object 608, or a complete set of measurements of the part 608, an indicator 620 of the results can be projected directly onto the part 608 as illustrated in FIG. 15B. This may be used to highlight certain features of the part that are within tolerance and/or outside of tolerance. For a surface scan, high and low points may be color coded and projected directly onto the part 608. For dimensioned feature measurements, a graphical or textual indicator 622 can be projected on the part 608 notifying the operator whether features are in and/or out of tolerance. As discussed above, this provides advantages in decreasing the amount of time needed for inspection of the part 608 since the operator does not need to look away to a computer terminal or user interface.

The projector 604 may also be used to illuminate the working area by projecting white light and the size and shape of the illumination can be controlled. In addition, the area of illumination may be locked while the device 600 is moved because the spotlight location and size can be controlled using the positional data of the probe end 401. If the device 600 is oriented such that the projector 604 cannot illuminate any of the part 608 (e.g., when pointing at the ceiling), then the projector 604 may automatically turn off or go to black.

Figure 16:
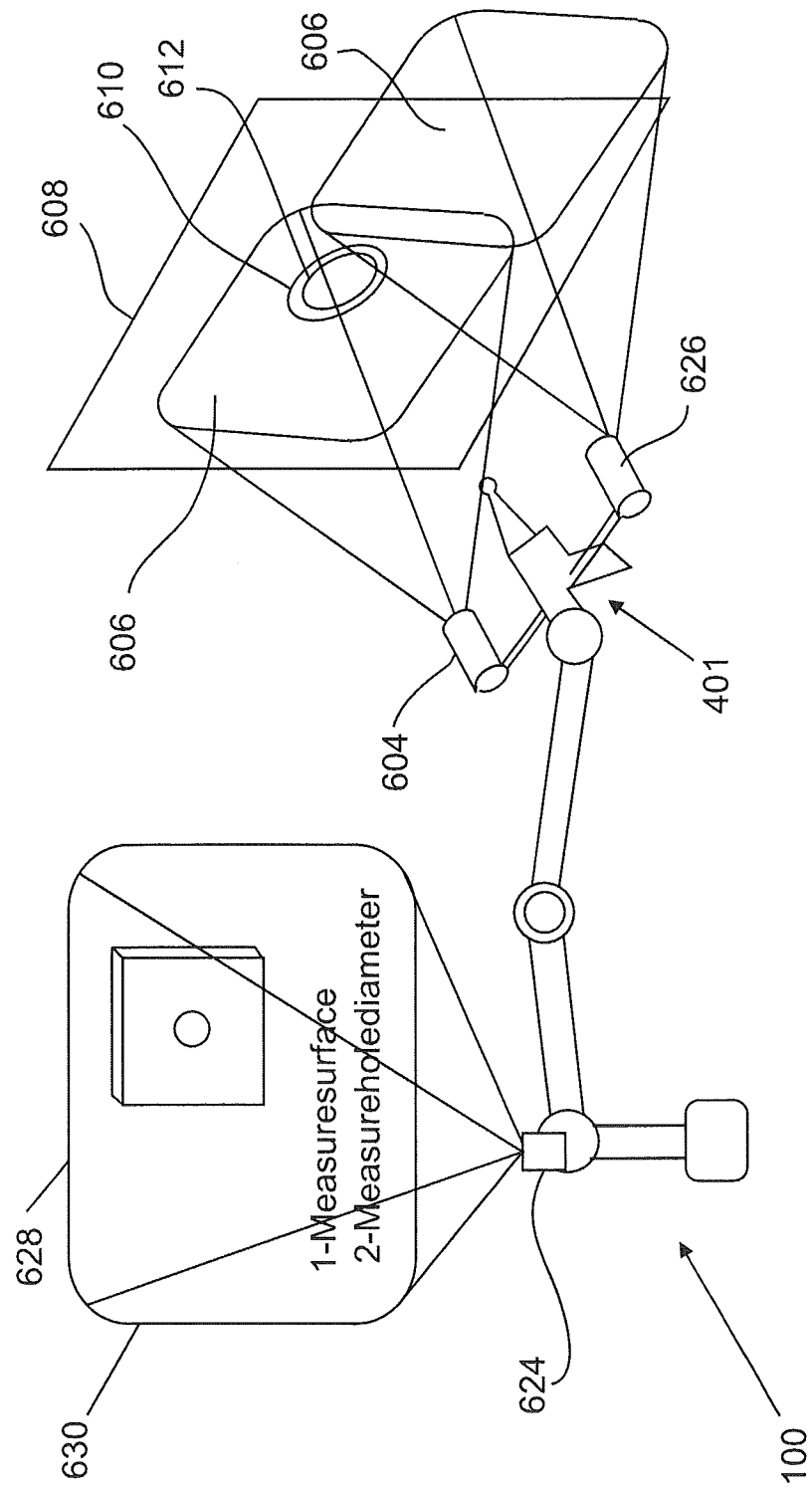
FIG. 16 is a perspective view of an AACMM with two projectors mounted onto a probe end and a third projector mounted on another portion of the AACMM.
Figure 17:
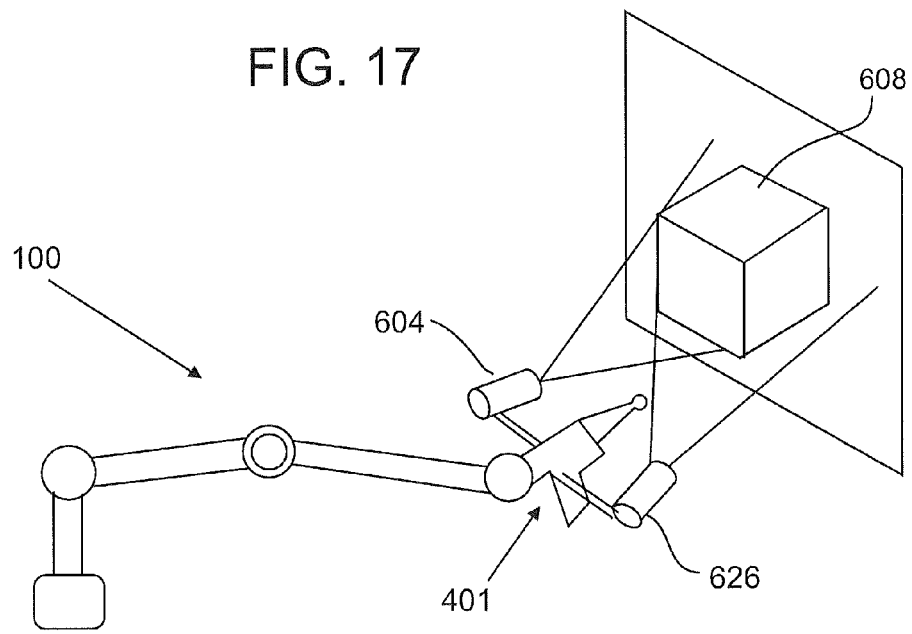
FIG. 17 is a perspective view of another AACMM with two projectors mounted onto a probe end.

Referring to FIGS. 16-17, in accordance with embodiments of another aspect of the present invention, multiple projectors 604, 624, 626 may be used with AACMM 100. An embodiment is the projector 624 points at a wall 628 or work surface. Here the projector 624 may be attached to a movable (e.g. swivel) mount on a fixed (non-moving) portion of the AACMM 100, such as on the base 116 for example. The image 630 from projector 624 may display the same information or different information as from the projector 604 mounted on the probe end 401. The image 630 may be for observation by a second party, or it may serve to replicate the on-board application software display or an ancillary computer display. In this manner, data may be made larger i.e., increased coverage area), or the data may be projected onto a surface 628 that is more easily viewed by the operator during the measurement session.

In addition, multiple projectors 604, 626 mounted on the probe end 401 of AACMM 100 may increase surface area coverage or coverage of 3D profiles, thus accommodating relatively greater movement of the probe end 401 without losing image coverage. The image contours can be adjusted to the contours of the part 608.

Figure 18:
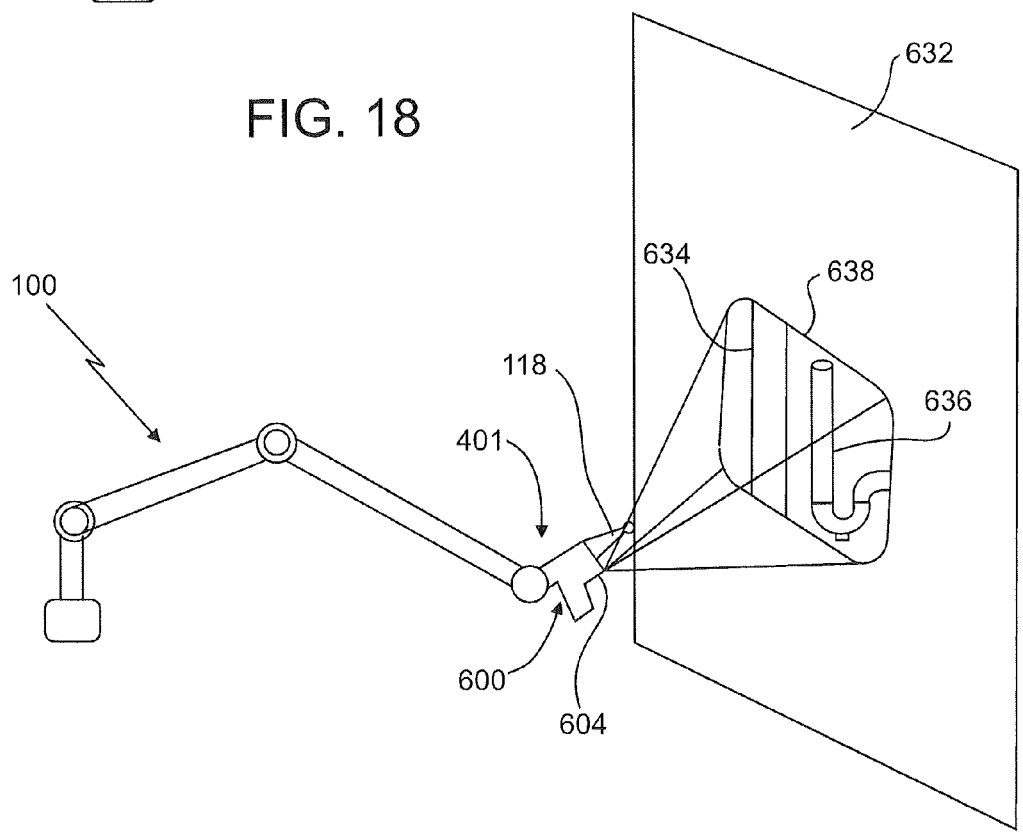
FIG. 18 is a perspective view of an AACMM with a projector mounted onto a probe end, where the projector projects an image onto a surface of a part, where the projected image contains hidden features behind the surface of the part.

Referring to FIG. 18, in accordance with embodiments of another aspect of the present invention, an AACMM 100 with a projector 604 mounted thereon may provide visual task guidance to the operator. Such visual task guidance may be in the form of visualization of features of objects or items that are hidden from view by a surface or other type of obstruction (e.g., a wall or human skin). For example, the projector 604 may project CAD data, CAT scan data, laser scan data, or other data on various surfaces 632 that have one or more objects 634, 636 or items behind the surface 632 that need to be accessed and worked on. However, it is important that the worker identify the precise location of these objects so that no damage is caused to other objects or to reduce that amount of time wasted trying to locate these hidden objects 634, 636. The surface 632 may be a surface of a wall, an assembly, a human body, or other types of surfaces that hide features or objects to be worked on.

FIG. 18 shows the example of an image 638 projected onto a wall surface 632. Behind the wall surface 632 are various items such as studs 634, plumbing pipes 636, and electrical wiring. However, the worker may not know what is positioned behind the wall surface 632 and/or does not know the positioning of these items behind the wall surface 632. It would be advantageous to provide the worker with an image of the items behind the wall surface 632 and the location of 3 those items. Generally, this information about the hidden features is available as, e.g., CAD data.

In another application, the AACMM 100 may be used in an operating room for example. A doctor may use a portable AACMM to determine the location for making an incision or finding a tumor, correlating the position of the probe or measurement device 118 with 3D data from Computer Axial Tomography data. In this case, the projector 604 may project an image on the patient, providing markers or actual replication of CAT scan imagery to guide the surgeon. Surgery performed remotely by manually operated robots may use projection systems in the same way as described above.

In applications where an AACMM is used in a manufacturing environment, the projector 604 may provide guidance for a variety of operations requiring positioning that is driven from 3D CAD or image files. This includes, for example: drilling holes for rivets, instruments, accessories; applying decals or adhesive backed stripes to cars, planes, buses or large parts; painting letters, details or images; grinding/sanding surfaces or welds until they conform to drawing requirements; and locating studs or structural members behind sheathing for nail or screw locations.

Embodiments of this aspect of the present invention provide for visualization of hidden features such as pipes, wiring, ducts, or other objects under walls, bulkheads, floors or behind locked doors helps to determine where cuts can be safely made. These embodiments also provide for projected visualization and guidance for drilling, cutting and access to critical components of explosive ordinance (e.g., when 3D CAD data of the device is available).

According to embodiments of this aspect of the present invention, a projection system for an AACMM projects guidance and part data (e.g., structural CAD data) onto a surface of a part. It also may be used to project images of what is inside walls, structures, or the human body for use in building modification, surgery or other invasive procedures. One or more miniature projectors attached to the arm can project images or data on a part or surface or provide guidance to the operator. The arm/projector combination may provide visualization of features hidden by walls, inside the human body, inside explosive devices, etc. When a 3D record (e.g., CAD drawing, CAT scan, etc.) of the object exists the projector and arm combination can project an image that shows the location of features, as if seeing through the wall.

Figure 19:
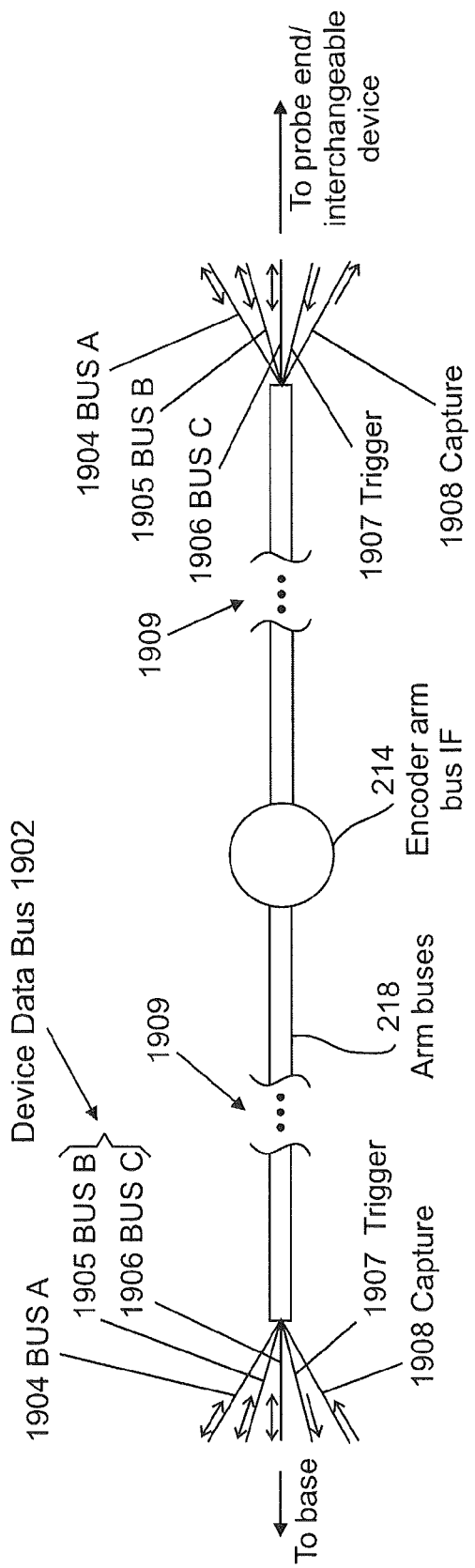
FIG. 19 is a block diagram of arm buses in an AACMM in accordance with an embodiment.

Referring to FIG. 19, an embodiment of arm buses 218 is generally shown. The arm buses 218 in FIG. 19 include a bus A 1904, a bus B 1905, a bus C 1906, a trigger bus 1907, and a capture bus 1908. The device data bus 1902 includes bus B 1905 and bus C 1906. Bus A 1904 is also called the encoder data bus. As used herein, the terms "bus" and "wire" are used interchangeably to refer to a transmission medium for transmitting signals such as synchronizing pulses and/or data.

FIG. 19 shows two continuation regions 1909. These are regions in which additional encoder arm bus IFs 214 can be inserted. For example, there may be seven encoder arm bus IFs 214 in the AACMM 100. The base 116 of AACMM 100, including base processor board 204, is to the left side of FIG. 19. The probe end 401 and interchangeable device (such as 400, 500, 600, 700) are to the right side of FIG. 19.

The capture bus 1908 sends a capture signal (or synchronizing pulse) from the base processor board 204 to the encoder DSPs 216, the probe end DSP 228, and the interchangeable device controllers (such as controllers 408, 512 or the controllers within 600, 700) so that data is captured by all AACMM sensor devices at the same time. In an embodiment, the capture bus 1908 as shown in FIG. 19 is implemented by a pair of differential wires (e.g., having one or more signals thereon operating at about seven hundred hertz). The capture signal on the capture bus 1908 reaches, almost simultaneously, the encoder DSPs 216, the probe end DSP 228, and the interchangeable device controllers. In other embodiments, a collection of differential wire pairs may be connected in parallel to all of the DSP encoders 216, the probe end DSP 228, and the interchangeable device controllers. As can be appreciated by those skilled in the art, the implementation of the capture bus 1908 is not limited to the embodiments described above, but may also be implemented in any manner known in the art such as, but not limited to, using single ended wires or using wires of different speeds. In an embodiment, the sending of the capture signal is staggered based on the distance of the receiving DSP from the base processor 204.

The encoder data bus 1904 and the device data bus 1902 that are a part of arm buses 218 operate independently and simultaneously, thereby enabling data to be transmitted on both of the buses at the same time. The capture signal on the capture bus 1908 simultaneously latches AACMM sensor data, which is then sent onto the encoder data bus 1904 and the device data bus1902. In one embodiment, the rate of the capture signal is determined by the time required to collect and process data from the sensor devices within the AACMM 100. In an embodiment, the encoder data bus 1904 and the device data bus 1902 are asynchronous buses. In an embodiment, the encoder data bus 1904 and the device data bus1902 are wireless buses.

The encoder data bus 1904 connects each of the encoder DSPs 216 to the base processor 204. The encoder data bus 1904 is interfaced to each encoder DSP 216 by an encoder arm bus IF 214, which may provide, for example, a conversion between differential pair signals carried on the encoder data bus 1904 and single ended signals sent to the ports of DSP 216. Data transmitted on the encoder data bus 1904 is used to determine the coordinates of a measurement device located on the AACMM (e.g., a probe 118). The encoder data bus 1904 is used by the base processor board 204 to request arm position signals from the encoder DSPs 216 and to receive position signals from the DSPs 216. It may operate in a half-duplex mode to accommodate the two-way traffic. The encoder data bus 1904 shown in FIG. 19 may be implemented by a single set of differential wires (e.g., transferring data at about three megabits per second). In other embodiments, the encoder data bus 1904 is implemented as a plurality of parallel buses. As can be appreciated by those skilled in the art, the implementation of the encoder data bus 1904 is not limited to the embodiments described above. The encoder data bus 1904 may be implemented in any manner known in the art such as, but not limited to, using single ended wires, or transferring data at different speeds.

The encoder data bus 1904 transmits position signals (e.g., counts from the encoder read head interfaces 234) from the encoder DSPs 216 via encoder arm bus interfaces 214, temperature data from the temperature sensors 212, and button selection status for any attached measurement devices (e.g., a probe, a removably coupled accessory device) via the probe end DSP 228.

Data transmitted on the device data bus 1902 includes data from an accessory device that is attached (e.g., removably attached) to the arm (e.g., LLP 500, functional device 600, paint spray device 700). The data from an accessory device may be processed by a controller associated with the accessory device (e.g., 408, 512 or controllers within 600, 700) and then put directly onto bus B 1905 or bus C 1906 within arm buses 218. Alternatively, the data from an accessory may be sent to probe end DSP 228, where it may be further processed before being passed onto bus B or bus C within the arm buses 218. The device data bus 1902 is used by the base processor board 204 to request accessory device data from an accessory device that is removably coupled to the measurement device and to receive accessory device controller or DSP. Such a controller might be the probe end DSP 228 or a controller within an accessory device (e.g., 408, 512 or controllers within 600, 700). Accessory device data includes any data generated by an accessory device such as, but not limited to, image data when the accessory device is a camera, video data when the accessory device is a video recorder, and two-dimensional center of gravity data (COG) when the accessory device is a LLP. In an embodiment, the device data bus 1902 also receives data identifying characteristics of the accessory device such as, but not limited to, the type of device data that the accessory device generates and the rate that it transmits the device data. The device data bus 1902 may operate in a half-duplex mode to accommodate the two-way traffic. The device data bus 1902 shown in FIG. 19 may be implemented by two sets of differential wires (e.g., transferring at a combined data at about six megabits per second). As can be appreciated by those skilled in the art, the implementation of the device data bus 1902 is not limited to the embodiments described above, but may also be implemented in any manner known in the art such as, but not limited to using single ended wires, or transferring data at different speeds.

The bus B 1905 and the bus C 1906 enter and exit each encoder arm bus IF 214. Because there is no need to transform the signals traveling on bus B or bus C to a different form (e.g., from differential pair to single ended, or vice versa), the encoder arm bus IF 214 in an embodiment serves as a simple pass-though for data traveling on bus B and bus C.

Trigger bus 1907 carries a trigger signal from a sensor within AACMM 100 to base processor board 204. The trigger signal carried on the trigger bus 1907 serves as a request for action to the base processor board 204. A good example of a trigger signal is one generated by a touch trigger probe, which is a type of probe that responds electronically when the probe is touched or brought near to an object. In an embodiment, the touch trigger probe sends a trigger signal to the base processor board 204, which treats the trigger signal as a request to immediately send a capture signal over the capture bus 1908. The base processor sends out the capture signal, causing the readings of all the encoders in the AACMM 100 to be latched. As a result, the encoder readings are closely synchronized to the instant at which the tip of the touch trigger probe makes contact with the object. The trigger bus is not limited to this use with the touch trigger probe, and may carry trigger signals from a variety of different sensors to the base processor board 204. Furthermore, the trigger signal from the trigger bus may be used by an external computer instead of, or in addition to, the base processor board 204. Also, the base processor board 204 or external computer may respond in a variety of ways to a trigger signal carried by the trigger bus 1907.

As indicated by the arrows next to the buses 1904-1908 in FIG. 19, bus A, bus B, and bus C are bidirectional; signals are sent from and received by the base processor board 204 over these three buses. Trigger bus 1907 is unidirectional; trigger signals carried by trigger bus 1907 are received by, but not sent from, the base processor board 204. Capture bus 1908 is also unidirectional; capture signals carried by capture bus 1908 are sent from, but not received by, base processor board 204.

Figure 20:
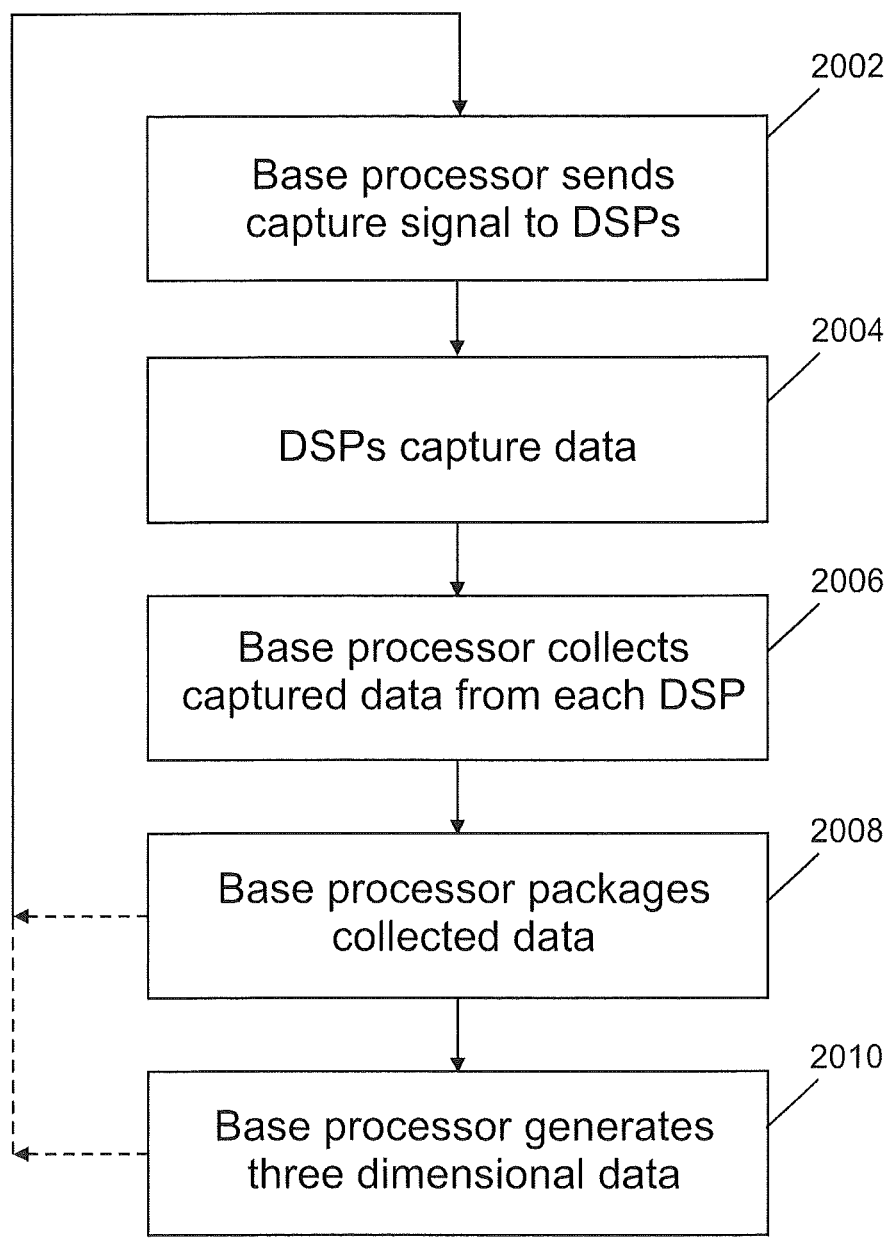
FIG. 20 is a process flow of data capture in an AACMM in accordance with an embodiment.

FIG. 20 is a process flow of data capture in an AACMM in accordance with an embodiment. The process flow depicted in FIG. 20 is initiated by the base processor board 204. At step 2002, the base processor board 204 sends a capture signal on the capture bus 1908 to the encoder DSPs 216, the probe end DSP 228, and the interchangeable device controllers (such as controllers 408, 512 or the controllers within 600, 700). The capture signal is initiated by the base processor board 204, either as a result of a routine polling process or as a result of a request of a request received from the trigger signal on the trigger bus 1907. At step 2004, the encoder DSPs 216, the probe end DSP 228, and the interchangeable device controllers capture (or latch) data in response to receiving the capture signal. The encoder DSPs 216 latch data such as encoder counts and temperature. The probe end DSP 228 latches button press status, which indicates the status of any buttons on the measurement device and/or accessory devices. The data from interchangeable device controllers may be placed directly onto the device data bus 1902, or they may be sent first to probe end DSP 228 for processing before being placed on the device data bus 1902.

At step 2006, the base processor board 204 collects the captured data from the encoder DSPs 216, the probe end DSP 228, and the interchangeable device controllers (such as controllers 408, 512 or the controllers within 600, 700). In an embodiment, this is performed by the base processor 204 sending an address and a command (e.g., in a packet) requesting the captured data (e.g., position signals). The first encoder DSP 216 recognizes the address in the packet as its own and returns the captured data to the base processor board 204. The base processor board 204 continues requesting and receiving the captured data on the encoder data bus 1904 from the rest of the encoder DSPs 216, the probe end DSP 228, and the interchangeable device controllers. The base processor board 204 receives the data from the DSPs and controllers one at a time until it has received all of the captured data. At step 2008, the base processor board 204 packages the collected data so that all of the position signals and button press statuses for the given capture signal are correlated. Processing then continues at step 2002 where another capture signal is sent to the encoder DSPs 216, the probe end DSP 228, and the interchangeable device controllers. Processing also continues at step 2010, where the base processor 204 generates three dimensional position data (x, y, z) and button status from the raw captured data. The actions carried out by the computation step 2010 may be carried out in parallel to the actions in the data collection steps 2002-2008. Alternatively, the actions of 2010 may be carried out following the collection of sufficient data by steps 2002-2008. In the latter case, the completion of step 2010 may initiate further collection of data in steps 2002-2008. The two possible paths (parallel or sequential data collection/computation) are indicated by the dashed lines in the feedback loops from steps 2008 and 2010.

In an embodiment, steps 2002 through 2008 are performed continuously while the AACMM 100 is in operation. In addition, if a touch probe is connected to the AACMM, the touch probe can request issuance of a capture signal (e.g., when the probe tip contacts or nearly contacts an object).

FIG. 21 is a process flow of simultaneous capture of encoder data on the encoder data bus 1904 and accessory data from the device data bus 1902 in accordance with an embodiment. The process flow depicted in FIG. 21 is performed when an accessory device (e.g., a LLP, a camera) is attached to the AACMM 100. At step 2102, the accessory device is detected in the handle of the AACMM 100. Steps 2104 and 2106 are performed in parallel (e.g., simultaneously) to collect the position signals and device data for an object being measured. At step 2106, the position signals are collected by transmitting them over the encoder data bus 1904, and the accessory data is collected by transmitting it on the device data bus 1902. At step 2108, the collected data is processed to generate the desired result, which might be a three-dimensional coordinate of a point on an object. In an embodiment, the accessory device is an LLP and the data over device data bus 1902 includes center of gravity (COG) data. This data is combined with the position signals from the encoder DSPs 216 to obtain three-dimensional (3D) coordinates for a collection of points on the object. In another embodiment, the accessory device is a camera and the data from the camera includes image data. This image data is combined with the position signals to overlay one or more 3D data points on the image. In an embodiment, the collected data is exported to an external computer and step 2108 is performed by the external computer. At optional step 2110, the view of the object is displayed on the color LCD 338 on the AACMM 100. The processing of the collected data in step 2108 may be carried out in parallel to the data collection steps, 2104 and 2106, or step 2108 may be carried out after steps 2104 and 2106. In the latter case, the completion of a computation in step 2108 may start of new cycle of data collection in steps 2104 and 2106.

FIGS. 20 and 21 show how data is collected by the base processor board 204 to provide information about the dimensional characteristics of an object. In another mode of operation, the base processor board 204 may mostly transmit data. Examples of two devices that mostly transmit data are an image projector and a paint sprayer.

Technical effects and benefits include the ability to simultaneously transmit arm position signals on one bus and accessory device data on a second bus. This may lead to increased system performance and throughput by allowing more data to be collected in response to each capture signal. In addition, the AACMM 100 may be able to support a broader range of accessory devices by not requiring all accessory devices to be compliant with the internal bus utilized to collect position data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A portable articulated arm coordinate measurement machine (AACMM), comprising:
    a manually positionable articulated arm portion having opposed first and second ends, the arm portion including a plurality of connected arm segments, each of the arm segments including at least one position transducer for producing a position signal;
    a measurement device coupled to the first end;
    an electronic circuit configured to receive the position signal from the at least one position transducer and to provide data corresponding to a position of the measurement device;
    a probe end disposed between the measurement device and the first end;
    an accessory device removably coupled to the probe end;
    an encoder data bus coupled to the at least one transducer and the electronic circuit, the encoder data bus configured to send the position signal to the electronic circuit; and
    a first device data bus coupled to the accessory device and the electronic circuit, the first device data bus configured to operate simultaneously with and independently of the encoder data bus for sending accessory device data from the accessory device to the electronic circuit.

2. The portable AACMM of claim 1, wherein the position signal includes counts.

3. The portable AACMM of claim 1, wherein the accessory device includes at least one of a laser line probe, a camera, a bar code scanner, a thermal scanner, a video camera, a light source, an image projector, a microphone, an audio recording system, and a paint-spray nozzle.

4. The portable AACMM of claim 3, wherein the measurement device is a contact probe.

5. The portable AACMM of claim 3, wherein the measurement device is the accessory device.

6. The portable AACMM of claim 1, wherein the encoder data bus is coupled to the measurement device.

7. The portable AACMM of claim 1, wherein the encoder data bus is further configured to send a button selection from the probe end or the measurement device to the electronic circuit.

8. The portable AACMM of claim 1, wherein the encoder data bus is further configured to send button selection data from the accessory device to the electronic circuit.

9. The portable AACMM of claim 1, wherein the encoder data bus is further configured to send temperature data from the arm segments to the electronic circuit.

10. The portable AACMM of claim 1, wherein the first device data bus is further configured to send data from the accessory device to the electronic circuit to identify characteristics of the accessory device.

11. The portable AACMM of claim 1, wherein the measurement device is a contact probe, the accessory device is a laser line probe (LLP), and the accessory device data includes a plurality of two dimensional data values generated by the LLP.

12. The portable AACMM of claim 1, wherein the measurement device is a contact probe, the accessory device is a camera, and the accessory device data includes image data generated by the camera.

13. The portable AACMM of claim 1, wherein the encoder data bus and the first device data bus are asynchronous buses.

14. The portable AACMM of claim 1, wherein the encoder data bus and the first device data bus operate at different speeds.

15. The portable AACMM of claim 1, wherein the encoder data bus and the first device data bus have different bus widths.

16. The portable AACMM of claim 1, further comprising a second device data bus connected to the accessory device and the electronic circuit, the second device data bus configured to operate independently of the encoder data bus.

17. The portable AACMM of claim 1, wherein the encoder data bus is a wireless bus.

18. The portable AACMM of claim 1, wherein the first device data bus is a wireless bus.

19. A portable articulated arm coordinate measurement machine (AACMM), comprising:
    a manually positionable articulated arm portion having opposed first and second ends, the arm portion including a plurality of connected arm segments, each of the arm segments including at least one position transducer for producing a position signal;
    a measurement device coupled to the first end;

an electronic circuit configured to receive the position signal from the at least one position transducer and to provide data corresponding to a position of the measurement device;

a probe end disposed between the measurement device and the first end;

an encoder data bus coupled to the at least one transducer and the electronic circuit, the encoder data configured to send the position signal to the electronic circuit; and a first device data bus coupled to the measurement device and the electronic circuit, the first device data bus configured to operate simultaneously with and independently of the encoder data bus.

20. The portable AACMM of claim 19, wherein the encoder data bus and the first device data bus are asynchronous buses.

21. The portable AACMM of claim 19, wherein the encoder data bus and the first device data bus operate at different speeds.

22. The portable AACMM of claim 19, wherein the encoder data bus and the first device data bus have different bus widths.

23. The portable AACMM of claim 19, further comprising a second device data bus connected to the measurement device and the electronic circuit, the second device data bus configured to operate independently of the encoder data bus.

24. The portable AACMM of claim 19 wherein the position signals include counts.

25. The portable AACMM of claim 19, wherein the encoder data bus is further for sending button selection data from the measurement device to the electronic circuit.

26. The portable AACMM of claim 19, wherein the encoder data bus is further for sending temperature data from the arm segments to the electronic circuit.

27. The portable AACMM of claim 19, wherein the encoder data bus is a wireless bus.

28. The portable AACMM of claim 19, wherein the first device data bus is a wireless bus.

29. A method of operating a portable articulated arm coordinate measuring machine (AACMM), the method comprising:

receiving a position signal via an encoder data bus, the receiving by an electronic circuit on the portable AACMM, the portable AACMM comprised of a manually positionable articulated arm portion having opposed first and second ends, the arm portion including a plurality of connected arm segments, each arm segment including at least one position transducer for producing the position signal, a measurement device coupled to the first end, a probe end disposed between the measurement device and the first end, an accessory device removably coupled to the probe end, the electronic circuit, the encoder data bus in communication with the at least one position transducer and the electronic circuit, and a device data bus in communication with the accessory device and the electronic circuit; and receiving at the electronic circuit, via the device data bus, accessory device data from the accessory device, wherein the device data bus operates simultaneously with and independently of the encoder data bus.

30. The method of claim 29, further comprising exporting the position signal and the accessory device data to an external computer.

31. The method of claim 29, further comprising combining the position signal and the accessory device data to generate a view of the object.

32. The method of claim 29, further comprising displaying the object on a user interface located on the portable AACMM.

33. The method of claim 29, wherein the measurement device is a contact probe, the accessory device is a laser line probe and the accessory device data is a plurality of two dimensional values generated by the laser line probe.

34. The method of claim 29, wherein the measurement device is a contact probe, the accessory device is a camera and the accessory device data is image data.

35. The method of claim 29, wherein the encoder data bus is a wireless bus.

36. The method of claim 29, wherein the device data bus is a wireless bus.

37. The method of claim 29, wherein the measurement device is the accessory device.

* * * * *